(12) United States Patent
Soricut et al.

(10) Patent No.: US 8,886,517 B2
(45) Date of Patent: Nov. 11, 2014

(54) TRUST SCORING FOR LANGUAGE TRANSLATION SYSTEMS

(75) Inventors: Radu Soricut, Manhattan Beach, CA (US); Daniel Marcu, Manhattan Beach, CA (US)

(73) Assignee: Language Weaver, Inc., Los Angeles, CA (US)

( * ) Notice: Subject to any disclaimer, the term of this patent is extended or adjusted under 35 U.S.C. 154(b) by 278 days.

(21) Appl. No.: 13/539,037

(22) Filed: Jun. 29, 2012

(65) Prior Publication Data

US 2014/0006003 A1 Jan. 2, 2014

Related U.S. Application Data

(63) Continuation of application No. 11/454,212, filed on Jun. 15, 2006, which is a continuation of application No. 12/820,061, filed on Jun. 21, 2010, now Pat. No. 8,676,563, application No. 13/539,037, which is a continuation-in-part of application No. 12/572,021, filed on Oct. 3, 2009, now Pat. No. 8,380,486, application No. 13/539,037, which is a continuation of application No. PCT/US2011/039523, filed on Jun. 7, 2011.

(60) Provisional application No. 60/691,949, filed on Jun. 17, 2005.

(51) Int. Cl.
*G06F 17/28* (2006.01)

(52) U.S. Cl.
CPC .................................. *G06F 17/2854* (2013.01)
USPC .......................................................... 704/2

(58) Field of Classification Search
CPC ....................................................... G06F 17/28

USPC .......................................................... 704/1–10
See application file for complete search history.

(56) References Cited

U.S. PATENT DOCUMENTS

| 4,502,128 A | 2/1985 | Okajima et al. |
| 4,599,691 A | 7/1986 | Sakaki et al. |
| 4,615,002 A | 9/1986 | Innes |

(Continued)

FOREIGN PATENT DOCUMENTS

| EP | 0469884 | 2/1992 |
| EP | 0715265 | 6/1996 |

(Continued)

OTHER PUBLICATIONS

Rayner et al.,"Hybrid Language Processing in the Spoken Language Translator," IEEE 1997, pp. 107-110.

(Continued)

*Primary Examiner* — Abul Azad
(74) *Attorney, Agent, or Firm* — Carr & Ferrell LLP

(57) ABSTRACT

Systems and methods for generating trust scores for translations are described herein. According to some embodiments, methods for generating a trust score for a translation may include establishing a trust score for at least a portion of a first translation of a source text translated by a trusted translation system, the trust score representing an accuracy level for the first translation, comparing the first translation of the source text generated by the trusted translation system to a second translation of the source text generated by an untrusted translation system, and determining a trust score for the second translation based upon the comparison.

18 Claims, 5 Drawing Sheets

(56) References Cited

U.S. PATENT DOCUMENTS

| | | |
|---|---|---|
| 4,661,924 A | 4/1987 | Okamoto et al. |
| 4,787,038 A | 11/1988 | Doi et al. |
| 4,791,587 A | 12/1988 | Doi |
| 4,800,522 A | 1/1989 | Miyao et al. |
| 4,814,987 A | 3/1989 | Miyao et al. |
| 4,942,526 A | 7/1990 | Okajima et al. |
| 4,980,829 A | 12/1990 | Okajima et al. |
| 5,020,112 A | 5/1991 | Chou |
| 5,088,038 A | 2/1992 | Tanaka et al. |
| 5,091,876 A | 2/1992 | Kumano et al. |
| 5,146,405 A | 9/1992 | Church |
| 5,167,504 A | 12/1992 | Mann |
| 5,181,163 A | 1/1993 | Nakajima et al. |
| 5,212,730 A | 5/1993 | Wheatley et al. |
| 5,218,537 A | 6/1993 | Hemphill et al. |
| 5,220,503 A | 6/1993 | Suzuki et al. |
| 5,267,156 A | 11/1993 | Nomiyama |
| 5,268,839 A | 12/1993 | Kaji |
| 5,295,068 A | 3/1994 | Nishino et al. |
| 5,302,132 A | 4/1994 | Corder |
| 5,311,429 A | 5/1994 | Tominaga |
| 5,387,104 A | 2/1995 | Corder |
| 5,408,410 A | 4/1995 | Kaji |
| 5,432,948 A | 7/1995 | Davis et al. |
| 5,442,546 A | 8/1995 | Kaji et al. |
| 5,477,450 A | 12/1995 | Takeda et al. |
| 5,477,451 A | 12/1995 | Brown et al. |
| 5,495,413 A | 2/1996 | Kutsumi et al. |
| 5,497,319 A | 3/1996 | Chong et al. |
| 5,510,981 A | 4/1996 | Berger et al. |
| 5,528,491 A | 6/1996 | Kuno et al. |
| 5,535,120 A | 7/1996 | Chong et al. |
| 5,541,836 A | 7/1996 | Church et al. |
| 5,541,837 A | 7/1996 | Fushimoto |
| 5,548,508 A | 8/1996 | Nagami |
| 5,644,774 A | 7/1997 | Fukumochi et al. |
| 5,675,815 A | 10/1997 | Yamauchi et al. |
| 5,687,383 A | 11/1997 | Nakayama et al. |
| 5,696,980 A | 12/1997 | Brew |
| 5,724,593 A | 3/1998 | Hargrave, III et al. |
| 5,752,052 A | 5/1998 | Richardson et al. |
| 5,754,972 A | 5/1998 | Baker et al. |
| 5,761,631 A | 6/1998 | Nasukawa |
| 5,761,689 A | 6/1998 | Rayson et al. |
| 5,768,603 A | 6/1998 | Brown et al. |
| 5,779,486 A | 7/1998 | Ho et al. |
| 5,781,884 A | 7/1998 | Pereira et al. |
| 5,794,178 A | 8/1998 | Caid et al. |
| 5,805,832 A | 9/1998 | Brown et al. |
| 5,806,032 A | 9/1998 | Sproat |
| 5,819,265 A | 10/1998 | Ravin et al. |
| 5,826,219 A | 10/1998 | Kutsumi |
| 5,826,220 A | 10/1998 | Takeda et al. |
| 5,845,143 A | 12/1998 | Yamauchi et al. |
| 5,848,385 A | 12/1998 | Poznanski et al. |
| 5,848,386 A | 12/1998 | Motoyama |
| 5,855,015 A | 12/1998 | Shoham |
| 5,864,788 A | 1/1999 | Kutsumi |
| 5,867,811 A | 2/1999 | O'Donoghue |
| 5,870,706 A | 2/1999 | Alshawi |
| 5,893,134 A | 4/1999 | O'Donoghue et al. |
| 5,903,858 A | 5/1999 | Saraki |
| 5,907,821 A | 5/1999 | Kaji et al. |
| 5,909,681 A | 6/1999 | Passera et al. |
| 5,930,746 A | 7/1999 | Ting |
| 5,963,205 A * | 10/1999 | Sotomayor ................ 715/236 |
| 5,966,685 A | 10/1999 | Flanagan et al. |
| 5,966,686 A | 10/1999 | Heidorn et al. |
| 5,983,169 A | 11/1999 | Kozma |
| 5,987,402 A | 11/1999 | Murata et al. |
| 5,987,404 A | 11/1999 | Della Pietra et al. |
| 5,991,710 A | 11/1999 | Papineni et al. |
| 5,995,922 A | 11/1999 | Penteroudakis et al. |
| 6,018,617 A | 1/2000 | Sweitzer et al. |
| 6,031,984 A | 2/2000 | Walser |
| 6,032,111 A | 2/2000 | Mohri |
| 6,047,252 A | 4/2000 | Kumano et al. |
| 6,064,819 A | 5/2000 | Franssen et al. |
| 6,064,951 A | 5/2000 | Park et al. |
| 6,073,143 A | 6/2000 | Nishikawa et al. |
| 6,077,085 A | 6/2000 | Parry et al. |
| 6,092,034 A | 7/2000 | McCarley et al. |
| 6,119,077 A | 9/2000 | Shinozaki |
| 6,131,082 A | 10/2000 | Hargrave, III et al. |
| 6,161,082 A | 12/2000 | Goldberg et al. |
| 6,182,014 B1 | 1/2001 | Kenyon et al. |
| 6,182,027 B1 | 1/2001 | Nasukawa et al. |
| 6,205,456 B1 | 3/2001 | Nakao |
| 6,206,700 B1 | 3/2001 | Brown et al. |
| 6,223,150 B1 | 4/2001 | Duan et al. |
| 6,233,544 B1 | 5/2001 | Alshawi |
| 6,233,545 B1 | 5/2001 | Datig |
| 6,233,546 B1 | 5/2001 | Datig |
| 6,236,958 B1 | 5/2001 | Lange et al. |
| 6,269,351 B1 | 7/2001 | Black |
| 6,275,789 B1 | 8/2001 | Moser et al. |
| 6,278,967 B1 | 8/2001 | Akers et al. |
| 6,278,969 B1 | 8/2001 | King et al. |
| 6,285,978 B1 | 9/2001 | Bernth et al. |
| 6,289,302 B1 | 9/2001 | Kuo |
| 6,304,841 B1 | 10/2001 | Berger et al. |
| 6,311,152 B1 | 10/2001 | Bai et al. |
| 6,317,708 B1 | 11/2001 | Witbrock et al. |
| 6,327,568 B1 | 12/2001 | Joost |
| 6,330,529 B1 | 12/2001 | Ito |
| 6,330,530 B1 | 12/2001 | Horiguchi et al. |
| 6,356,864 B1 | 3/2002 | Foltz et al. |
| 6,360,196 B1 | 3/2002 | Poznanski et al. |
| 6,389,387 B1 | 5/2002 | Poznanski et al. |
| 6,393,388 B1 | 5/2002 | Franz et al. |
| 6,393,389 B1 | 5/2002 | Chanod et al. |
| 6,415,250 B1 | 7/2002 | van den Akker |
| 6,460,015 B1 | 10/2002 | Hetherington et al. |
| 6,470,306 B1 | 10/2002 | Pringle et al. |
| 6,473,729 B1 | 10/2002 | Gastaldo et al. |
| 6,480,698 B2 | 11/2002 | Ho et al. |
| 6,490,549 B1 | 12/2002 | Ulicny et al. |
| 6,498,921 B1 | 12/2002 | Ho et al. |
| 6,502,064 B1 | 12/2002 | Miyahira et al. |
| 6,529,865 B1 | 3/2003 | Duan et al. |
| 6,535,842 B1 | 3/2003 | Roche et al. |
| 6,587,844 B1 | 7/2003 | Mohri |
| 6,609,087 B1 | 8/2003 | Miller et al. |
| 6,647,364 B1 | 11/2003 | Yumura et al. |
| 6,691,279 B2 | 2/2004 | Yoden et al. |
| 6,745,161 B1 | 6/2004 | Arnold et al. |
| 6,745,176 B2 | 6/2004 | Probert, Jr. et al. |
| 6,757,646 B2 | 6/2004 | Marchisio |
| 6,778,949 B2 | 8/2004 | Duan et al. |
| 6,782,356 B1 | 8/2004 | Lopke |
| 6,810,374 B2 | 10/2004 | Kang |
| 6,848,080 B1 | 1/2005 | Lee et al. |
| 6,857,022 B1 | 2/2005 | Scanlan |
| 6,885,985 B2 | 4/2005 | Hull |
| 6,901,361 B1 | 5/2005 | Portilla |
| 6,904,402 B1 | 6/2005 | Wang et al. |
| 6,952,665 B1 | 10/2005 | Shimomura et al. |
| 6,983,239 B1 | 1/2006 | Epstein |
| 6,996,518 B2 | 2/2006 | Jones et al. |
| 6,996,520 B2 | 2/2006 | Levin |
| 6,999,925 B2 | 2/2006 | Fischer et al. |
| 7,013,262 B2 | 3/2006 | Tokuda et al. |
| 7,016,827 B1 | 3/2006 | Ramaswamy et al. |
| 7,016,977 B1 | 3/2006 | Dunsmoir et al. |
| 7,024,351 B2 | 4/2006 | Wang |
| 7,031,911 B2 | 4/2006 | Zhou et al. |
| 7,050,964 B2 | 5/2006 | Menzes et al. |
| 7,085,708 B2 | 8/2006 | Manson |
| 7,089,493 B2 | 8/2006 | Hatori et al. |
| 7,103,531 B2 | 9/2006 | Moore |
| 7,107,204 B1 | 9/2006 | Liu et al. |
| 7,107,215 B2 | 9/2006 | Ghali |
| 7,113,903 B1 | 9/2006 | Riccardi et al. |
| 7,143,036 B2 | 11/2006 | Weise |

(56) References Cited

U.S. PATENT DOCUMENTS

| | | |
|---|---|---|
| 7,146,358 B1 | 12/2006 | Gravano et al. |
| 7,149,688 B2 | 12/2006 | Schalkwyk |
| 7,171,348 B2 | 1/2007 | Scanlan |
| 7,174,289 B2 | 2/2007 | Sukehiro |
| 7,177,792 B2 | 2/2007 | Knight et al. |
| 7,191,115 B2 | 3/2007 | Moore |
| 7,194,403 B2 | 3/2007 | Okura et al. |
| 7,197,451 B1 | 3/2007 | Carter et al. |
| 7,206,736 B2 | 4/2007 | Moore |
| 7,209,875 B2 * | 4/2007 | Quirk et al. ............. 704/2 |
| 7,219,051 B2 | 5/2007 | Moore |
| 7,239,998 B2 | 7/2007 | Xun |
| 7,249,012 B2 | 7/2007 | Moore |
| 7,249,013 B2 | 7/2007 | Al-Onaizan et al. |
| 7,283,950 B2 | 10/2007 | Pournasseh et al. |
| 7,295,962 B2 | 11/2007 | Marcu |
| 7,302,392 B1 | 11/2007 | Thenthiruperai et al. |
| 7,319,949 B2 | 1/2008 | Pinkham |
| 7,340,388 B2 | 3/2008 | Soricut et al. |
| 7,346,487 B2 | 3/2008 | Li |
| 7,346,493 B2 | 3/2008 | Ringger et al. |
| 7,349,839 B2 | 3/2008 | Moore |
| 7,349,845 B2 | 3/2008 | Coffman et al. |
| 7,356,457 B2 | 4/2008 | Pinkham et al. |
| 7,369,998 B2 | 5/2008 | Sarich et al. |
| 7,373,291 B2 | 5/2008 | Garst |
| 7,383,542 B2 | 6/2008 | Richardson et al. |
| 7,389,222 B1 | 6/2008 | Langmead et al. |
| 7,389,234 B2 | 6/2008 | Schmid et al. |
| 7,403,890 B2 | 7/2008 | Roushar |
| 7,409,332 B2 | 8/2008 | Moore |
| 7,409,333 B2 | 8/2008 | Wilkinson et al. |
| 7,447,623 B2 | 11/2008 | Appleby |
| 7,454,326 B2 | 11/2008 | Marcu et al. |
| 7,496,497 B2 | 2/2009 | Liu |
| 7,533,013 B2 | 5/2009 | Marcu |
| 7,536,295 B2 | 5/2009 | Cancedda et al. |
| 7,546,235 B2 | 6/2009 | Brockett et al. |
| 7,552,053 B2 | 6/2009 | Gao et al. |
| 7,565,281 B2 | 7/2009 | Appleby |
| 7,574,347 B2 | 8/2009 | Wang |
| 7,580,830 B2 | 8/2009 | Al-Onaizan et al. |
| 7,620,538 B2 | 11/2009 | Marcu et al. |
| 7,620,632 B2 | 11/2009 | Andrews |
| 7,624,005 B2 | 11/2009 | Koehn et al. |
| 7,624,020 B2 | 11/2009 | Yamada et al. |
| 7,627,479 B2 | 12/2009 | Travieso et al. |
| 7,680,646 B2 | 3/2010 | Lux-Pogodalla et al. |
| 7,689,405 B2 | 3/2010 | Marcu |
| 7,698,124 B2 | 4/2010 | Menezes et al. |
| 7,698,125 B2 | 4/2010 | Graehl et al. |
| 7,707,025 B2 | 4/2010 | Whitelock |
| 7,711,545 B2 | 5/2010 | Koehn |
| 7,716,037 B2 | 5/2010 | Precoda et al. |
| 7,813,918 B2 | 10/2010 | Muslea et al. |
| 7,822,596 B2 | 10/2010 | Elgazzar et al. |
| 7,925,494 B2 | 4/2011 | Cheng et al. |
| 7,957,953 B2 | 6/2011 | Moore |
| 7,974,833 B2 | 7/2011 | Soricut et al. |
| 8,060,360 B2 | 11/2011 | He |
| 8,145,472 B2 | 3/2012 | Shore et al. |
| 8,214,196 B2 | 7/2012 | Yamada et al. |
| 8,244,519 B2 | 8/2012 | Bicici et al. |
| 8,442,813 B1 * | 5/2013 | Popat ................. 704/9 |
| 8,676,563 B2 * | 3/2014 | Soricut et al. ............. 704/2 |
| 2001/0009009 A1 | 7/2001 | Iizuka |
| 2001/0029455 A1 | 10/2001 | Chin et al. |
| 2002/0002451 A1 | 1/2002 | Sukehiro |
| 2002/0013693 A1 | 1/2002 | Fuji |
| 2002/0040292 A1 | 4/2002 | Marcu |
| 2002/0046018 A1 | 4/2002 | Marcu et al. |
| 2002/0046262 A1 | 4/2002 | Heilig et al. |
| 2002/0059566 A1 | 5/2002 | Delcambre et al. |
| 2002/0078091 A1 | 6/2002 | Vu et al. |
| 2002/0087313 A1 | 7/2002 | Lee et al. |
| 2002/0099744 A1 | 7/2002 | Coden et al. |
| 2002/0111788 A1 | 8/2002 | Kimpara |
| 2002/0111789 A1 | 8/2002 | Hull |
| 2002/0111967 A1 | 8/2002 | Nagase |
| 2002/0143537 A1 | 10/2002 | Ozawa et al. |
| 2002/0152063 A1 | 10/2002 | Tokieda et al. |
| 2002/0169592 A1 | 11/2002 | Aityan |
| 2002/0188438 A1 | 12/2002 | Knight et al. |
| 2002/0188439 A1 | 12/2002 | Marcu |
| 2002/0198699 A1 | 12/2002 | Greene et al. |
| 2002/0198701 A1 | 12/2002 | Moore |
| 2002/0198713 A1 | 12/2002 | Franz et al. |
| 2003/0009322 A1 | 1/2003 | Marcu |
| 2003/0023423 A1 | 1/2003 | Yamada et al. |
| 2003/0144832 A1 | 7/2003 | Harris |
| 2003/0154071 A1 | 8/2003 | Shreve |
| 2003/0158723 A1 | 8/2003 | Masuichi et al. |
| 2003/0176995 A1 | 9/2003 | Sukehiro |
| 2003/0182102 A1 | 9/2003 | Corston-Oliver et al. |
| 2003/0191626 A1 | 10/2003 | Al-Onaizan et al. |
| 2003/0204400 A1 | 10/2003 | Marcu et al. |
| 2003/0216905 A1 | 11/2003 | Chelba et al. |
| 2003/0217052 A1 | 11/2003 | Rubenczyk et al. |
| 2003/0233222 A1 | 12/2003 | Soricut et al. |
| 2004/0015342 A1 | 1/2004 | Garst |
| 2004/0024581 A1 | 2/2004 | Koehn et al. |
| 2004/0030551 A1 | 2/2004 | Marcu et al. |
| 2004/0035055 A1 | 2/2004 | Zhu et al. |
| 2004/0044530 A1 | 3/2004 | Moore |
| 2004/0059708 A1 | 3/2004 | Dean et al. |
| 2004/0068411 A1 | 4/2004 | Scanlan |
| 2004/0098247 A1 | 5/2004 | Moore |
| 2004/0102956 A1 | 5/2004 | Levin |
| 2004/0102957 A1 | 5/2004 | Levin |
| 2004/0111253 A1 | 6/2004 | Luo et al. |
| 2004/0115597 A1 | 6/2004 | Butt |
| 2004/0122656 A1 | 6/2004 | Abir |
| 2004/0167768 A1 | 8/2004 | Travieso et al. |
| 2004/0167784 A1 | 8/2004 | Travieso et al. |
| 2004/0193401 A1 | 9/2004 | Ringger et al. |
| 2004/0230418 A1 | 11/2004 | Kitamura |
| 2004/0237044 A1 | 11/2004 | Travieso et al. |
| 2004/0260532 A1 | 12/2004 | Richardson et al. |
| 2005/0021322 A1 | 1/2005 | Richardson et al. |
| 2005/0021517 A1 | 1/2005 | Marchisio |
| 2005/0026131 A1 | 2/2005 | Elzinga et al. |
| 2005/0033565 A1 | 2/2005 | Koehn |
| 2005/0038643 A1 | 2/2005 | Koehn |
| 2005/0055199 A1 | 3/2005 | Ryzchachkin et al. |
| 2005/0060160 A1 | 3/2005 | Roh et al. |
| 2005/0075858 A1 | 4/2005 | Pournasseh et al. |
| 2005/0086226 A1 | 4/2005 | Krachman |
| 2005/0102130 A1 | 5/2005 | Quirk et al. |
| 2005/0125218 A1 | 6/2005 | Rajput et al. |
| 2005/0149315 A1 | 7/2005 | Flanagan et al. |
| 2005/0171757 A1 | 8/2005 | Appleby |
| 2005/0204002 A1 | 9/2005 | Friend |
| 2005/0228640 A1 | 10/2005 | Aue et al. |
| 2005/0228642 A1 | 10/2005 | Mau et al. |
| 2005/0228643 A1 | 10/2005 | Munteanu et al. |
| 2005/0234701 A1 | 10/2005 | Graehl et al. |
| 2005/0267738 A1 | 12/2005 | Wilkinson et al. |
| 2006/0004563 A1 | 1/2006 | Campbell et al. |
| 2006/0015320 A1 | 1/2006 | Och |
| 2006/0015323 A1 | 1/2006 | Udupa et al. |
| 2006/0018541 A1 | 1/2006 | Chelba et al. |
| 2006/0020448 A1 | 1/2006 | Chelba et al. |
| 2006/0041428 A1 | 2/2006 | Fritsch et al. |
| 2006/0095248 A1 | 5/2006 | Menezes et al. |
| 2006/0111891 A1 | 5/2006 | Menezes et al. |
| 2006/0111892 A1 | 5/2006 | Menezes et al. |
| 2006/0111896 A1 | 5/2006 | Menezes et al. |
| 2006/0129424 A1 | 6/2006 | Chan |
| 2006/0142995 A1 | 6/2006 | Knight et al. |
| 2006/0150069 A1 | 7/2006 | Chang |
| 2006/0167984 A1 | 7/2006 | Fellenstein et al. |
| 2006/0190241 A1 | 8/2006 | Goutte et al. |
| 2007/0016400 A1 | 1/2007 | Soricutt et al. |
| 2007/0016401 A1 | 1/2007 | Ehsani et al. |

(56) References Cited

U.S. PATENT DOCUMENTS

| | | |
|---|---|---|
| 2007/0033001 A1 | 2/2007 | Muslea et al. |
| 2007/0050182 A1 | 3/2007 | Sneddon et al. |
| 2007/0078654 A1 | 4/2007 | Moore |
| 2007/0078845 A1 | 4/2007 | Scott et al. |
| 2007/0083357 A1 | 4/2007 | Moore et al. |
| 2007/0094169 A1 | 4/2007 | Yamada et al. |
| 2007/0112553 A1 | 5/2007 | Jacobson |
| 2007/0112555 A1 | 5/2007 | Lavi et al. |
| 2007/0112556 A1 | 5/2007 | Lavi et al. |
| 2007/0122792 A1 | 5/2007 | Galley et al. |
| 2007/0168202 A1 | 7/2007 | Changela et al. |
| 2007/0168450 A1 | 7/2007 | Prajapat et al. |
| 2007/0180373 A1 | 8/2007 | Bauman et al. |
| 2007/0219774 A1 | 9/2007 | Quirk et al. |
| 2007/0250306 A1 | 10/2007 | Marcu et al. |
| 2007/0265825 A1 | 11/2007 | Cancedda et al. |
| 2007/0265826 A1 | 11/2007 | Chen et al. |
| 2007/0269775 A1 | 11/2007 | Andreev et al. |
| 2007/0294076 A1 | 12/2007 | Shore et al. |
| 2008/0052061 A1 | 2/2008 | Kim et al. |
| 2008/0065478 A1 | 3/2008 | Kohlmeier et al. |
| 2008/0114583 A1 | 5/2008 | Al-Onaizan et al. |
| 2008/0154581 A1 | 6/2008 | Lavi et al. |
| 2008/0183555 A1 | 7/2008 | Walk |
| 2008/0215418 A1 | 9/2008 | Kolve et al. |
| 2008/0249760 A1 | 10/2008 | Marcu et al. |
| 2008/0270109 A1 | 10/2008 | Och |
| 2008/0270112 A1 | 10/2008 | Shimohata |
| 2008/0281578 A1 | 11/2008 | Kumaran et al. |
| 2008/0307481 A1 | 12/2008 | Panje |
| 2009/0076792 A1 | 3/2009 | Lawson-Tancred |
| 2009/0083023 A1 | 3/2009 | Foster et al. |
| 2009/0119091 A1 | 5/2009 | Sarig |
| 2009/0125497 A1 | 5/2009 | Jiang et al. |
| 2009/0234634 A1 | 9/2009 | Chen et al. |
| 2009/0241115 A1 | 9/2009 | Raffo et al. |
| 2009/0326912 A1 | 12/2009 | Ueffing |
| 2010/0017293 A1 | 1/2010 | Lung et al. |
| 2010/0042398 A1 | 2/2010 | Marcu et al. |
| 2010/0138213 A1 | 6/2010 | Bicici et al. |
| 2010/0174524 A1 | 7/2010 | Koehn |
| 2011/0029300 A1 | 2/2011 | Marcu et al. |
| 2011/0066643 A1 | 3/2011 | Cooper et al. |
| 2011/0082684 A1 | 4/2011 | Soricut et al. |
| 2013/0024184 A1* | 1/2013 | Vogel et al. .................. 704/9 |

FOREIGN PATENT DOCUMENTS

| | | |
|---|---|---|
| EP | 0933712 | 8/1999 |
| EP | 0933712 | 1/2001 |
| JP | 07244666 | 9/1995 |
| JP | 10011447 | 1/1998 |
| JP | 11272672 | 10/1999 |
| WO | WO03083709 | 10/2003 |

OTHER PUBLICATIONS

Resnik, P. and Smith, A., "The Web as a Parallel Corpus," Sep. 2003, Computational Linguistics, Special Issue on Web as Corpus, vol. 29, Issue 3, pp. 349-380.

Resnik, P. and Yarowsky, D. "A Perspective on Word Sense Disambiguation Methods and Their Evaluation," 1997, Proceedings of SIGLEX '97, Washington, D.C., pp. 79-86.

Resnik, Philip, "Mining the Web for Bilingual Text," 1999, 37th Annual Meeting of the ACL, College Park, MD, pp. 527-534.

Rich, E. and Knight, K., "Artificial Intelligence, Second Edition," 1991, McGraw-Hill Book Company [Front Matter].

Richard et al., "Visiting the Traveling Salesman Problem with Petri nets and application in the glass industry," Feb. 1996, IEEE Emerging Technologies and Factory Automation, pp. 238-242.

Robin, Jacques, "Revision-Based Generation of Natural Language Summaries Providing Historical Background: Corpus-Based Analysis, Design Implementation and Evaluation," 1994, Ph.D. Thesis, Columbia University, New York.

Rogati et al., "Resource Selection for Domain-Specific Cross-Lingual IR," ACM 2004, pp. 154-161.

Zhang, R. et al., "The NiCT-ATR Statistical Machine Translation System for the IWSLT 2006 Evaluation," submitted to IWSLT, 2006.

Russell, S. and Norvig, P., "Artificial Intelligence: A Modern Approach," 1995, Prentice-Hall, Inc., New Jersey [Front Matter].

Sang, E. and Buchholz, S., "Introduction to the CoNLL-2000 Shared Task: Chunking," 2002, Proc. of CoNLL-2000 and LLL-2000, Lisbon, Portugal, pp. 127-132.

Schmid, H., and Schulte im Walde, S., "Robust German Noun Chunking With a Probabilistic Context-Free Grammar," 2000, Proc. of the 18th Conference on Computational Linguistics, vol. 2, pp. 726-732.

Schutze, Hinrich, "Automatic Word Sense Discrimination," 1998, Computational Linguistics, Special Issue on Word Sense Disambiguation, vol. 24, Issue 1, pp. 97-123.

Selman et al., "A New Method for Solving Hard Satisfiability Problems," 1992, Proc. of the 10th National Conference on Artificial Intelligence, San Jose, CA, pp. 440-446.

Kumar, S. and Byrne, W., "Minimum Bayes-Risk Decoding for Statistical Machine Translation." HLTNAACL Conference. Mar. 2004, 8 pages.

Shapiro, Stuart (ed.), "Encyclopedia of Artificial Intelligence, 2nd edition", vol. D 2,1992, John Wiley & Sons Inc; "Unification" article, K. Knight, pp. 1630-1637.

Shirai, S., "A Hybrid Rule and Example-based Method for Machine Translation," 1997, NTT Communication Science Laboratories, pp. 1-5.

Sobashima et al., "A Bidirectional Transfer-Driven Machine Translation System for Spoken Dialogues," 1994, Proc. of 15th Conference on Computational Linguistics, vol. 1, pp. 64-68.

Soricut et al., "Using a Large Monolingual Corpus to Improve Translation Accuracy," 2002, Lecture Notes in Computer Science, vol. 2499, Proc. of the 5th Conference of the Association for Machine Translation in the Americas on Machine Translation: From Research to Real Users, pp. 155-164.

Stalls, B. and Knight, K., "Translating Names and Technical Terms in Arabic Text," 1998, Proc. of the COLING/ACL Workkshop on Computational Approaches to Semitic Language.

Sumita et al., "A Discourse Structure Analyzer for Japanese Text," 1992, Proc. of the International Conference on Fifth Generation Computer Systems, vol. 2, pp. 1133-1140.

Sun et al., "Chinese Named Entity Identification Using Class-based Language Model," 2002, Proc. of 19th International Conference on Computational Linguistics, Taipei, Taiwan, vol. 1, pp. 1-7.

Tanaka, K. and Iwasaki, H. "Extraction of Lexical Translations from Non-Aligned Corpora," Proceedings of COLING 1996.

Taskar, B., et al., "A Discriminative Matching Approach to Word Alignment," In Proceedings of the Conference on Human Language Technology and Empirical Methods in Natural Language Processing (Vancouver, BC, Canada, Oct. 6-8, 2005). Human Language Technology Conference. Assoc. for Computational Linguistics, Moristown, NJ.

Taylor et al., "The Penn Treebank: An Overview," in A. Abeill (ed.), D Treebanks: Building and Using Parsed Corpora, 2003, pp. 5-22.

Tiedemann, Jorg, "Automatic Construction of Weighted String Similarity Measures," 1999, In Proceedings of the Joint SIGDAT Conference on Empirical Methods in Natural Language Processing and Very Large Corpora.

Tillman, C. and Xia, F., "A Phrase-Based Unigram Model for Statistical Machine Translation," 2003, Proc. of the North American Chapter of the ACL on Human Language Technology, vol. 2, pp. 106-108.

Tillmann et al., "A DP Based Search Using Monotone Alignments in Statistical Translation," 1997, Proc. of the Annual Meeting of the ACL, pp. 366-372.

Tomas, J., "Binary Feature Classification for Word Disambiguation in Statistical Machine Translation," Proceedings of the 2nd Int'l. Workshop on Pattern Recognition, 2002, pp. 1-12.

Uchimoto, K. et al., "Word Translation by Combining Example-Based Methods and Machine Learning Models," Natural Language Processing (Shizen Gengo Shori), vol. 10, No. 3, Apr. 2003, pp. 87-114.

(56) References Cited

OTHER PUBLICATIONS

Uchimoto, K. et al., "Word Translation by Combining Example-based Methods and Machine Learning Models," Natural LanguageProcessing (Shizen Gengo Shori), vol. 10, No. 3, Apr. 2003, pp. 87-114. (English Translation).

Ueffing et al., "Generation of Word Graphs in Statistical Machine Translation," 2002, Proc. of Empirical Methods in Natural Language Processing (EMNLP), pp. 156-163.

Varga et al., "Parallel Corpora for Medium Density Languages", In Proceedings of RANLP 2005, pp. 590-596.

Veale, T. and Way, A., "Gaijin: A Bootstrapping, Template-Driven Approach to Example-Based MT," 1997, Proc. of New Methods in Natural Language Processing (NEMPLP97), Sofia, Bulgaria.

Vogel et al., "The CMU Statistical Machine Translation System," 2003, Machine Translation Summit IX, New Orleans, LA.

Vogel et al., "The Statistical Translation Module in the Verbmobil System," 2000, Workshop on Multi-Lingual Speech Communication, pp. 69-74.

Vogel, S. and Ney, H., "Construction of a Hierarchical Translation Memory," 2000, Proc. of Cooling 2000, Saarbrucken, Germany, pp. 1131-1135.

Wang, Y. and Waibel, A., "Decoding Algorithm in Statistical Machine Translation," 1996, Proc. of the 35th Annual Meeting of the ACL, pp. 366-372.

Wang, Ye-Yi, "Grammar Inference and Statistical Machine Translation," 1998, Ph.D Thesis, Carnegie Mellon University, Pittsburgh, PA.

Watanabe et al., "Statistical Machine Translation Based on Hierarchical Phrase Alignment," 2002, 9th International Conference on Theoretical and Methodological Issues in Machine Translation (TMI-2002), Keihanna, Japan, pp. 188-198.

Witbrock, M. and Mittal, V., "Ultra-Summarization: A Statistical Approach to Generating Highly Condensed Non-Extractive Summaries," 1999, Proc. of SIGIR '99, 22nd International Conference on Research and Development in Information Retrieval, Berkeley, CA, pp. 315-316.

Wu, Dekai, "A Polynomial-Time Algorithm for Statistical Machine Translation," 1996, Proc. of 34th Annual Meeting of the ACL, pp. 152-158.

Wu, Dekai, "Stochastic Inversion Transduction Grammars and Bilingual Parsing of Parallel Corpora," 1997, Computational Linguistics, vol. 23, Issue 3, pp. 377-403.

Yamada, K. and Knight, K. "A Syntax-Based Statistical Translation Model," 2001, Proc. of the 39th Annual Meeting of the ACL, pp. 523-530.

Yamada, K. and Knight, K., "A Decoder for Syntax-Based Statistical MT," 2001, Proceedings of the 40th Annual Meeting of the ACL, pp. 303-310.

Yamada K., "A Syntax-Based Statistical Translation Model," 2002 PhD Dissertation, pp. 1-141.

Yamamoto et al., "A Comparative Study on Translation Units for Bilingual Lexicon Extraction," 2001, Japan Academic Association for Copyright Clearance, Tokyo, Japan.

Yamamoto et al, "Acquisition of Phrase-level Bilingual Correspondence using Dependency Structure" In Proceedings of COLING-2000, pp. 933-939.

Yarowsky, David, "Unsupervised Word Sense Disambiguation Rivaling Supervised Methods," 1995, 33rd Annual Meeting of the ACL, pp. 189-196.

Zhang et al., "Synchronous Binarization for Machine Translations," Jun. 4-9, 2006, in Proc. of the Human Language Technology Conference of the North American Chapter of the ACL, pp. 256-263.

Kumar, R. and Li, H., "Integer Programming Approach to Printed Circuit Board Assembly Time Optimization," 1995, IEEE Transactions on Components, Packaging, and Manufacturing, Part B: Advance Packaging, vol. 18, No. 4. pp. 720-727.

Kupiec, Julian, "An Algorithm for Finding Noun Phrase Correspondences in Bilingual Corpora," In Proceedings of the 31st Annual Meeting of the ACL, 1993, pp. 17-22.

Kurohashi, S. and Nagao, M., "Automatic Detection of Discourse Structure by Checking Surface Information in Sentences," 1994, Proc. of COL-LING '94, vol. 2, pp. 1123-1127.

Langkilde, I. and Knight, K., "Generation that Exploits Corpus-Based Statistical Knowledge," 1998, Proc. of the COLING-ACL, pp. 704-710.

Langkilde, I. and Knight, K., "The Practical Value of N-Grams in Generation," 1998, Proc. of the 9th International Natural Language Generation Workshop, pp. 248-255.

Langkilde, Irene, "Forest-Based Statistical Sentence Generation," 2000, Proc. of the 1st Conference on North American chapter of the ACL, Seattle, WA, pp. 170-177.

Langkilde-Geary, Irene, "A Foundation for General-Purpose Natural Language Generation: Sentence Realization Using Probabilistic Models of Language," 2002, Ph.D. Thesis, Faculty of the Graduate School, University of Southern California.

Langkilde-Geary, Irene, "An Empirical Verification of Coverage and Correctness for a General-Purpose Sentence Generator," 1998, Proc. 2nd Int'l Natural Language Generation Conference.

Lee, Yue-Shi,"Neural Network Approach to Adaptive Learning: with an Application to Chinese Homophone Disambiguation," IEEE 2001 pp. 1521-1526.

Lita, L. et al. "tRuEcasIng," 2003 Proceedings of the 41st Annual Meeting of the Assoc. for Computational Linguistics (In Hinrichs, E. and Roth, D.—editors), pp. 152-159.

Llitjos, A. F. et al., "The Translation Correction Tool: English-Spanish User Studies," Citeseer © 2004, downloaded from: http://gs37.sp.cs.cmu.edu/ari/papers/lrec04/fontll, pp. 1-4.

Mann, G. and Yarowsky, D., "Multipath Translation Lexicon Induction via Bridge Languages," 2001, Proc. of the 2nd Conference of the North American Chapter of the ACL, Pittsburgh, PA, pp. 151-158.

Manning, C. and Schutze, H., "Foundations of Statistical Natural Language Processing," 2000, The MIT Press, Cambridge, MA [Front Matter].

Marcu, D. and Wong, W., "A Phrase-Based, Joint Probability Model for Statistical Machine Translation," 2002, Proc. of ACL-2 conference on Empirical Methods in Natural Language Processing, vol. 10, pp. 133-139.

Marcu, Daniel, "Building Up Rhetorical Structure Trees," 1996, Proc. of the National Conference on Artificial Intelligence and Innovative Applications of Artificial Intelligence Conference, vol. 2, pp. 1069-1074.

Marcu, Daniel, "Discourse trees are good indicators of importance in text," 1999, Advances in Automatic Text Summarization, The MIT Press, Cambridge, MA.

Marcu, Daniel, "Instructions for Manually Annotating the Discourse Structures of Texts," 1999, Discourse Annotation, pp. 1-49.

Marcu, Daniel, "The Rhetorical Parsing of Natural Language Texts," 1997, Proceedings of ACLIEACL '97, pp. 96-103.

Marcu, Daniel, "The Rhetorical Parsing, Summarization, and Generation of Natural Language Texts," 1997, Ph.D. Thesis, Graduate Department of Computer Science, University of Toronto.

Marcu, Daniel, "Towards a Unified Approach to Memory- and Statistical-Based Machine Translation," 2001, Proc. of the 39th Annual Meeting of the ACL, pp. 378-385.

McCallum, A. and Li, W., "Early Results for Named Entity Recognition with Conditional Random Fields, Feature Induction and Web-enhanced Lexicons," In Proceedings of the Seventh Conference on Natural Language Learning at HLT-NAACL, 2003, vol. 4 (Edmonton, Canada), Assoc. for Computational Linguistics, Morristown, NJ, pp. 188-191.

McDevitt, K. et al., "Designing of a Community-based Translation Center," Technical Report TR-03-30, Computer Science, Virginia Tech, © 2003, pp. 1-8.

Melamed, I. Dan, "A Word-to-Word Model of Translational Equivalence," 1997, Proc. of the 35th Annual Meeting of the ACL, Madrid, Spain, pp. 490-497.

Melamed, I. Dan, "Automatic Evaluation and Uniform Filter Cascades for Inducing N-Best Translation Lexicons," 1995, Proc. of the 3rd Workshop on Very Large Corpora, Boston, MA, pp. 184-198.

Melamed, I. Dan, "Empirical Methods for Exploiting Parallel Texts," 2001, MIT Press, Cambridge, MA [table of contents].

(56) References Cited

OTHER PUBLICATIONS

Meng et al.. "Generating Phonetic Cognates to Handle Named Entities in English-Chinese Cross-Language Spoken Document Retrieval," 2001, IEEE Workshop on Automatic Speech Recognition and Understanding. pp. 311-314.
Metze, F. et al., "The NESPOLE! Speech-to-Speech Translation System," Proc. of the HLT 2002, 2nd Int'l Conf. on Human Language Technology (San Francisco, CA), © 2002, pp. 378-383.
Mikheev et al., "Named Entity Recognition without Gazeteers," 1999, Proc. of European Chapter of the ACL, Bergen, Norway, pp. 1-8.
Miike et al., "A Full-Text Retrieval System with a Dynamic Abstract Generation Function," 1994, Proceedings of SI-GIR '94, pp. 152-161.
Mohri, M. and Riley, M., "An Efficient Algorithm for the N-Best-Strings Problem," 2002, Proc. of the 7th Int. Conf. on Spoken Language Processing (ICSLP'02), Denver, CO, pp. 1313-1316.
Mohri, Mehryar, "Regular Approximation of Context Free Grammars Through Transformation", 2000, pp. 251-261, "Robustness in Language and Speech Technology", Chapter 9, Kluwer Academic Publishers.
Monasson et al., "Determining Computational Complexity from Characteristic 'Phase Transitions'," Jul. 1999, Nature Magazine, vol. 400, pp. 133-137.
Mooney, Raymond, "Comparative Experiments on Disambiguating Word Senses: An Illustration of the Role of Bias in Machine Learning," 1996, Proc. of the Conference on Empirical Methods in Natural Language Processing, pp. 82-91.
Nagao, K. et al., "Semantic Annotation and Transcoding: Making Web Content More Accessible," IEEE Multimedia, vol. 8, Issue 2 Apr.-Jun. 2001, pp. 69-81.
Nederhof, M. and Satta, G., "IDL-Expressions: A Formalism for Representing and Parsing Finite Languages in Natural Language Processing," 2004, Journal of Artificial Intelligence Research, vol. 21, pp. 281-287.
Niessen, S. and Ney, H, "Toward Hierarchical Models for Statistical Machine Translation of Inflected Languages," 2001, Data-Driven Machine Translation Workshop, Toulouse, France, pp. 47-54.
Norvig, Peter, "Techniques for Automatic Memorization with Applications to Context-Free Parsing", Computational Linguistics,1991, pp. 91-98, vol. 17, No. 1.
Och et al., "Improved Alignment Models for Statistical Machine Translation," 1999, Proc. of the Joint Conf. of Empirical Methods in Natural Language Processing and Very Large Corpora, pp. 20-28.
Och et al. "A Smorgasbord of Features for Statistical Machine Translation." HLTNAACL Conference. Mar. 2004, 8 pages.
Och, F., "Minimum Error Rate Training in Statistical Machine Translation," In Proceedings of the 41st Annual Meeting on Assoc. for Computational Linguistics—vol. 1 (Sapporo, Japan, Jul. 7-12, 2003). Annual Meeting of the ACL. Assoc. for Computational Linguistics, Morristown, NJ, 160-167. DOI=http://dx.doi.org/10.3115/1075096.
Och, F. and Ney, H, "Improved Statistical Alignment Models," 2000, 38th Annual Meeting of the ACL, Hong Kong, pp. 440-447.
Och, F. and Ney, H., "Discriminative Training and Maximum Entropy Models for Statistical Machine Translation," 2002, Proc. of the 40th Annual Meeting of the ACL, Philadelphia, PA, pp. 295-302.
Och, F. and Ney, H., "A Systematic Comparison of Various Statistical Alignment Models," Computational Linguistics, 2003, 29:1, 19-51.
Papineni et al., "Bleu: a Method for Automatic Evaluation of Machine Translation," 2001, IBM Research Report, RC22176(WQ102-022).
Perugini, Saviero et al., "Enhancing Usability in CITIDEL: Multimodal, Multilingual and Interactive Visualization Interfaces," JCDL '04, Tucson, AZ, Jun. 7-11, 2004, pp. 315-324.
Petrov et al., "Learning Accurate, Compact and Interpretable Tree Annotation," Jun. 4-9, 2006, in Proc. of the Human Language Technology Conference of the North American Chapter of the ACL, pp. 433-440.
Pla et al., "Tagging and Chunking with Bigrams," 2000, Proc. of the 18th Conference on Computational Linguistics, vol. 2, pp. 614-620.

Qun, Liu, "A Chinese-English Machine Translation System Based on Micro-Engine Architecture," An Int'l. Conference on Translation and Information Technology, Hong Kong, Dec. 2000, pp. 1-10.
Rapp, Reinhard, Automatic Identification of Word Translations from Unrelated English and German Corpora, 1999, 37th Annual Meeting of the ACL, pp. 519-526.
Rapp, Reinhard, "Identifying Word Translations in Non-Parallel Texts," 1995, 33rd Annual Meeting of the ACL, pp. 320-322.
Non-Final, May 9, 2013, U.S. Appl. No. 11/454,212, filed Jun. 15, 2006.
Advisory, Nov. 29, 2011, U.S. Appl. No. 11/454,212, filed Jun. 15, 2006.
Final, Aug. 15, 2011, U.S. Appl. No. 11/454,212, filed Jun. 15, 2006.
Non-Final, Mar. 1, 2011, U.S. Appl. No. 11/454,212, filed Jun. 15, 2006.
Advisory, Sep. 30, 2010, U.S. Appl. No. 11/454,212, filed Jun. 15, 2006.
Final, Jul. 19, 2010, U.S. Appl. No. 11/454,212, filed Jun. 15, 2006.
Non-Final, Nov. 27, 2009, U.S. Appl. No. 11/454,212, filed Jun. 15, 2006.
Final, Sep. 24, 2009, U.S. Appl. No. 11/454,212, filed Jun. 15, 2006.
Non-Final, Mar. 3, 2009, U.S. Appl. No. 11/454,212, filed Jun. 15, 2006.
Final, Oct. 27, 2008, U.S. Appl. No. 11/454,212, filed Jun. 15, 2006.
Non-Final, Apr. 17, 2008, U.S. Appl. No. 11/454,212, filed Jun. 15, 2006.
Allowance, Jul. 9, 2009, U.S. Appl. No. 11/223,823, filed Sep. 9, 2005.
Non-Final, Feb. 3, 2009, U.S. Appl. No. 11/223,823, filed Sep. 9, 2005.
Non-Final, Aug. 6, 2008, U.S. Appl. No. 11/223,823, filed Sep. 9, 2005.
Advisory, Jun. 9, 2008, U.S. Appl. No. 11/223,823, filed Sep. 9, 2005.
Non-Final, Sep. 20, 2007, U.S. Appl. No. 11/223,823, filed Sep. 9, 2005.
Final, Mar. 4, 2008, U.S. Appl. No. 11/223,823, filed Sep. 9, 2005.
Allowance, Jun. 10, 2010, U.S. Appl. No. 11/197,744, filed Aug. 3, 2005.
Non-Final, Dec. 15, 2009, U.S. Appl. No. 11/197,744, filed Aug. 3, 2005.
Final, Aug. 25, 2009, U.S. Appl. No. 11/197,744, filed Aug. 3, 2005.
Non-Final, Feb. 10, 2009, U.S. Appl. No. 11/197,744, filed Aug. 3, 2005.
Non-Final, Jun. 18, 2008, U.S. Appl. No. 11/197,744, filed Aug. 3, 2005.
Final, May 7, 2013, U.S. Appl. No. 11/272,460, filed Nov. 9, 2005.
Non-Final, Oct. 3, 2012, U.S. Appl. No. 11/272,460, filed Nov. 9, 2005.
Final, Jan. 27, 2010, U.S. Appl. No. 11/272,460, filed Nov. 9, 2005.
Examiner's Answer, Jul. 23, 2009, U.S. Appl. No. 11/272,460, filed Nov. 9, 2005.
Advisory, Jan. 22, 2009, U.S. Appl. No. 11/272,460, filed Nov. 9, 2005.
Final, Oct. 7, 2008, U.S. Appl. No. 11/272,460, filed Nov. 9, 2005.
Non-Final, Mar. 10, 2008, U.S. Appl. No. 11/272,460, filed Nov. 9, 2005.
Allowance, Mar. 20, 2009, U.S. Appl. No. 09/854,327, filed May 11, 2001.
Non-Final, Oct. 2, 2008, U.S. Appl. No. 09/854,327, filed May 11, 2001.
Final, Dec. 14, 2007, U.S. Appl. No. 09/854,327, filed May 11, 2001.
Non-Final, Jun. 6, 2007, U.S. Appl. No. 09/854,327, filed May 11, 2001.
Advisory, Jan. 10, 2007, U.S. Appl. No. 09/854,327, filed May 11, 2001.
Final, Sep. 18, 2006, U.S. Appl. No. 09/854,327, filed May 11, 2001.
Non-Final, Mar. 17, 2006, U.S. Appl. No. 09/854,327, filed May 11, 2001.
Non-Final, Sep. 15, 2005, U.S. Appl. No. 09/854,327, filed May 11, 2001.
Allowance, Jul. 30, 2007, U.S. Appl. No. 10/143,382, filed May 9, 2002.

(56) References Cited

OTHER PUBLICATIONS

Non-Final, Mar. 6, 2007, U.S. Appl. No. 10/143,382, filed May 9, 2002.
Non-Final, Aug. 8, 2006, U.S. Appl. No. 10/143,382, filed May 9, 2002.
Allowance, Nov. 16, 2009, U.S. Appl. No. 10/150,532, filed May 17, 2002.
Final, Jan. 12, 2009, U.S. Appl. No. 10/150,532, filed May 17, 2002.
Non-Final, Jul. 29, 2008, U.S. Appl. No. 10/150,532, filed May 17, 2002.
Non-Final, Jan. 9, 2008, U.S. Appl. No. 10/150,532, filed May 17, 2002.
Final, Jul. 19, 2007, U.S. Appl. No. 10/150,532, filed May 17, 2002.
Non-Final, Oct. 18, 2006, U.S. Appl. No. 10/150,532, filed May 17, 2002.
Non-Final, Apr. 17, 2006, U.S. Appl. No. 10/150,532, filed May 17, 2002.
Allowance, Apr. 28, 2006, U.S. Appl. No. 10/160,284, filed May 31, 2002.
Non-Final, Oct. 11, 2005, U.S. Appl. No. 10/160,284, filed May 31, 2002.
Allowance, Feb. 6, 2012, U.S. Appl. No. 10/190,298, filed Jul. 3, 2002.
Allowance, Oct. 25, 2011, U.S. Appl. No. 10/190,298, filed Jul. 3, 2002.
Final, Jan. 20, 2011, U.S. Appl. No. 10/190,298, filed Jul. 3, 2002.
Non-Final, Aug. 5, 2010, U.S. Appl. No. 10/190,298, filed Jul. 3, 2002.
Final, Aug. 18, 2009, U.S. Appl. No. 10/190,298, filed Jul. 3, 2002.
Non-Final, Feb. 26, 2009, U.S. Appl. No. 10/190,298, filed Jul. 3, 2002.
Non-Final, Aug. 4, 2008, U.S. Appl. No. 10/190,298, filed Jul. 3, 2002.
Advisory, Apr. 15, 2008, U.S. Appl. No. 10/190,298, filed Jul. 3, 2002.
Final, Dec. 7, 2007, U.S. Appl. No. 10/190,298, filed Jul. 3, 2002.
Non-Final, Jul. 19, 2007, U.S. Appl. No. 10/190,298, filed Jul. 3, 2002.
Advisory, Aug. 25, 2006, U.S. Appl. No. 10/190,298, filed Jul. 3, 2002.
Final, Jun. 8, 2006, U.S. Appl. No. 10/190,298, filed Jul. 3, 2002.
Non-Final, Feb. 14, 2006, U.S. Appl. No. 10/190,298, filed Jul. 3, 2002.
Non-Final, Sep. 29, 2005, U.S. Appl. No. 10/190,298, filed Jul. 3, 2002.
Allowance, Oct. 10, 2007, U.S. Appl. No. 10/401,134, filed Mar. 26, 2003.
Non-Final, Oct. 10, 2006, U.S. Appl. No. 10/401,134, filed Mar. 26, 2003.
Allowance, Jul. 10, 2009, U.S. Appl. No. 10/401,124, filed Mar. 26, 2003.
Final, Jun. 16, 2009, U.S. Appl. No. 10/401,124, filed Mar. 26, 2003.
Non-Final, Dec. 12, 2008, U.S. Appl. No. 10/401,124, filed Mar. 26, 2003.
Non-Final, May 13, 2008, U.S. Appl. No. 10/401,124, filed Mar. 26, 2003.
Non-Final, Oct. 12, 2007, U.S. Appl. No. 10/401,124, filed Mar. 26, 2003.
Advisory, Jul. 18, 2007, U.S. Appl. No. 10/401,124, filed Mar. 26, 2003.
Final, Apr. 3, 2007, U.S. Appl. No. 10/401,124, filed Mar. 26, 2003.
Non-Final, Oct. 11, 2006, U.S. Appl. No. 10/401,124, filed Mar. 26, 2003.
Allowance, Mar. 30, 2007, U.S. Appl. No. 10/387,032, filed Mar. 11, 2003.
Non-Final, Nov. 7, 2006, U.S. Appl. No. 10/387,032, filed Mar. 11, 2003.
Allowance, Jul. 9, 2009, U.S. Appl. No. 10/403,862, filed Mar. 28, 2003.
Non-Final, Nov. 13, 2008, U.S. Appl. No. 10/403,862, filed Mar. 28, 2003.
Advisory, Aug. 1, 2008, U.S. Appl. No. 10/403,862, filed Mar. 28, 2003.
Final, May 7, 2008, U.S. Appl. No. 10/403,862, filed Mar. 28, 2003.
Non-Final, Oct. 31, 2007, U.S. Appl. No. 10/403,862, filed Mar. 28, 2003.
Advisory, Jul. 30, 2007, U.S. Appl. No. 10/403,862, filed Mar. 28, 2003.
Final, May 9, 2007, U.S. Appl. No. 10/403,862, filed Mar. 28, 2003.
Non-Final, Nov. 8, 2006, U.S. Appl. No. 10/403,862, filed Mar. 28, 2003.
Allowance, Jul. 30, 2008, U.S. Appl. No. 10/402,350, filed Mar. 27, 2003.
Non-Final, Nov. 16, 2007, U.S. Appl. No. 10/402,350, filed Mar. 27, 2003.
Advisory, Aug. 15, 2007, U.S. Appl. No. 10/402,350, filed Mar. 27, 2003.
Final, May 30, 2007, U.S. Appl. No. 10/402,350, filed Mar. 27, 2003.
Non-Final, Nov. 8, 2006, U.S. Appl. No. 10/402,350, filed Mar. 27, 2003.
Allowance, May 15, 2013, U.S. Appl. No. 10/884,175, filed Jul. 2, 2004.
Advisory, Nov. 15, 2011, U.S. Appl. No. 10/884,175, filed Jul. 2, 2004.
Final, Aug. 29, 2011, U.S. Appl. No. 10/884,175, filed Jul. 2, 2004.
Non-Final, Feb. 4, 2011, U.S. Appl. No. 10/884,175, filed Jul. 2, 2004.
Advisory, May 3, 2010, U.S. Appl. No. 10/884,175, filed Jul. 2, 2004.
Final, Feb. 18, 2010, U.S. Appl. No. 10/884,175, filed Jul. 2, 2004.
Non-Final, Sep. 18, 2009, U.S. Appl. No. 10/884,175, filed Jul. 2, 2004.
Non-Final, Apr. 7, 2009, U.S. Appl. No. 10/884,175, filed Jul. 2, 2004.
Non-Final, Oct. 6, 2008, U.S. Appl. No. 10/884,175, filed Jul. 2, 2004.
Non-Final, Mar. 24, 2008, U.S. Appl. No. 10/884,175, filed Jul. 2, 2004.
Non-Final, Sep. 5, 2007, U.S. Appl. No. 10/884,175, filed Jul. 2, 2004.
Allowance, Dec. 31, 2009, U.S. Appl. No. 10/884,174, filed Jul. 2, 2004.
Non-Final, Aug. 11, 2009, U.S. Appl. No. 10/884,174, filed Jul. 2, 2004.
Final, Apr. 28, 2009, U.S. Appl. No. 10/884,174, filed Jul. 2, 2004.
Non-Final, Oct. 6, 2008, U.S. Appl. No. 10/884,174, filed Jul. 2, 2004.
Non-Final, Mar. 27, 2008, U.S. Appl. No. 10/884,174, filed Jul. 2, 2004.
Non-Final, Sep. 19, 2007, U.S. Appl. No. 10/884,174, filed Jul. 2, 2004.
Allowance, Jan. 13, 2010, U.S. Appl. No. 11/082,216, filed Mar. 15, 2005.
Allowance, Dec. 1, 2009, U.S. Appl. No. 11/082,216, filed Mar. 15, 2005.
Final, Oct. 9, 2009, U.S. Appl. No. 11/082,216, filed Mar. 15, 2005.
Non-Final, Mar. 31, 2009, U.S. Appl. No. 11/082,216, filed Mar. 15, 2005.
Allowance, Jul. 23, 2012, U.S. Appl. No. 11/087,376, filed Mar. 22, 2005.
Allowance, Jun. 12, 2012, U.S. Appl. No. 11/087,376, filed Mar. 22, 2005.
Allowance, Jul. 13, 2011, U.S. Appl. No. 11/087,376, filed Mar. 22, 2005.
Examiner's Answer, Nov. 28, 2008, U.S. Appl. No. 11/087,376, filed Mar. 22, 2005.
Advisory, Feb. 22, 2008, U.S. Appl. No. 11/087,376, filed Mar. 22, 2005.
Final, Nov. 14, 2007, U.S. Appl. No. 11/087,376, filed Mar. 22, 2005.
Non-Final, May 24, 2007, U.S. Appl. No. 11/087,376, filed Mar. 22, 2005.
Final, Apr. 9, 2012, U.S. Appl. No. 11/107,304, filed Apr. 15, 2005.

(56) References Cited

OTHER PUBLICATIONS

Non-Final, Aug. 30, 2011, U.S. Appl. No. 11/107,304, filed Apr. 15, 2005.
Final, Nov. 19, 2009, U.S. Appl. No. 11/107,304, filed Apr. 15, 2005.
Non-Final, May 13, 2009, U.S. Appl. No. 11/107,304, filed Apr. 15, 2005.
Advisory, Feb. 12, 2009, U.S. Appl. No. 11/107,304, filed Apr. 15, 2005.
Final, Dec. 4, 2008, U.S. Appl. No. 11/107,304, filed Apr. 15, 2005.
Non-Final, Jun. 9, 2008, U.S. Appl. No. 11/107,304, filed Apr. 15, 2005.
Non-Final, Dec. 21, 2007, U.S. Appl. No. 11/107,304, filed Apr. 15, 2005.
Allowance, Aug. 5, 2013, U.S. Appl. No. 11/250,151, filed Oct. 12, 2005.
Final, Aug. 29, 2012, U.S. Appl. No. 11/250,151, filed Oct. 12, 2005.
Non-Final, Dec. 2, 2011, U.S. Appl. No. 11/250,151, filed Oct. 12, 2005.
Final, Oct. 14, 2010, U.S. Appl. No. 11/250,151, filed Oct. 12, 2005.
Non-Final, May 13, 2010, U.S. Appl. No. 11/250,151, filed Oct. 12, 2005.
Final, Dec. 11, 2009, U.S. Appl. No. 11/250,151, filed Oct. 12, 2005.
Non-Final, May 13, 2009, U.S. Appl. No. 11/250,151, filed Oct. 12, 2005.
Non-Final, Oct. 28, 2008, U.S. Appl. No. 11/250,151, filed Oct. 12, 2005.
Allowance, Feb. 18, 2011, U.S. Appl. No. 11/158,897, filed Jun. 21, 2005.
Non-Final, Jun. 9, 2010, U.S. Appl. No. 11/158,897, filed Jun. 21, 2005.
Final, Sep. 10, 2009, U.S. Appl. No. 11/158,897, filed Jun. 21, 2005.
Non-Final, Mar. 17, 2009, U.S. Appl. No. 11/158,897, filed Jun. 21, 2005.
Allowance, Oct. 25, 2012, U.S. Appl. No. 11/592,450, filed Nov. 2, 2006.
Non-Final, Feb. 14, 2012, U.S. Appl. No. 11/592,450, filed Nov. 2, 2006.
Final, Feb. 28, 2011, U.S. Appl. No. 11/592,450, filed Nov. 2, 2006.
Non-Final, Sep. 28, 2010, U.S. Appl. No. 11/592,450, filed Nov. 2, 2006.
Non-Final, Apr. 1, 2010, U.S. Appl. No. 11/592,450, filed Nov. 2, 2006.
Advisory, Nov. 1, 2011, U.S. Appl. No. 11/635,248, filed Dec. 5, 2006.
Final, Aug. 9, 2011, U.S. Appl. No. 11/635,248, filed Dec. 5, 2006.
Non-Final, Mar. 16, 2011, U.S. Appl. No. 11/635,248, filed Dec. 5, 2006.
Non-Final, Sep. 28, 2010, U.S. Appl. No. 11/635,248, filed Dec. 5, 2006.
Non-Final, Sep. 11, 2013, U.S. Appl. No. 11/635,248, filed Dec. 5, 2006.
Advisory, Nov. 16, 2010, U.S. Appl. No. 11/501,189, filed Aug. 7, 2006.
Final, Sep. 2, 2010, U.S. Appl. No. 11/501,189, filed Aug. 7, 2006.
Non-Final, Apr. 13, 2010, U.S. Appl. No. 11/501,189, filed Aug. 7, 2006.
Allowance, Feb. 25, 2008, U.S. Appl. No. 11/412,307, filed Apr. 26, 2006.
Allowance, Feb. 19, 2008, U.S. Appl. No. 11/412,307, filed Apr. 26, 2006.
Non-Final, Aug. 7, 2007, U.S. Appl. No. 11/412,307, filed Apr. 26, 2006.
Non-final, Jul. 17, 2013, U.S. Appl. No. 11/640,157, filed Dec. 15, 2006.
Final, Dec. 4, 2012, U.S. Appl. No. 11/640,157, filed Dec. 15, 2006.
Non-Final, May 9, 2012, U.S. Appl. No. 11/640,157, filed Dec. 15, 2006.
Advisory, Nov. 17, 2011, U.S. Appl. No. 11/640,157, filed Dec. 15, 2006.
Final, Aug. 31, 2011, U.S. Appl. No. 11/640,157, filed Dec. 15, 2006.
Non-Final, Apr. 26, 2011, U.S. Appl. No. 11/640,157, filed Dec. 15, 2006.
Final, Sep. 1, 2010, U.S. Appl. No. 11/640,157, filed Dec. 15, 2006.
Non-Final, Jan. 21, 2010, U.S. Appl. No. 11/640,157, filed Dec. 15, 2006.
Allowance, Feb. 11, 2013, U.S. Appl. No. 11/698,501, filed Jan. 26, 2007.
Non-Final, Jun. 7, 2012, U.S. Appl. No. 11/698,501, filed Jan. 26, 2007.
Final, Jul. 6, 2010, U.S. Appl. No. 11/698,501, filed Jan. 26, 2007.
Non-Final, Dec. 22, 2009, U.S. Appl. No. 11/698,501, filed Jan. 26, 2007.
Final, Aug. 4, 2009, U.S. Appl. No. 11/698,501, filed Jan. 26, 2007.
Non-Final, Dec. 24, 2008, U.S. Appl. No. 11/698,501, filed Jan. 26, 2007.
Non-Final, Jun. 4, 2013, U.S. Appl. No. 11/784,161, filed Apr. 4, 2007.
Final, Jul. 11, 2012, U.S. Appl. No. 11/784,161, filed Apr. 4, 2007.
Non-Final, Oct. 4, 2011, U.S. Appl. No. 11/784,161, filed Apr. 4, 2007.
Final, Oct. 13, 2010, U.S. Appl. No. 11/784,161, filed Apr. 4, 2007.
Non-Final, Apr. 26, 2010, U.S. Appl. No. 11/784,161, filed Apr. 4, 2007.
Non-Final, Jul. 2, 2012, U.S. Appl. No. 12/077,005, filed Mar. 14, 2008.
Non-Final, Jun. 17, 2011, U.S. Appl. No. 12/077,005, filed Mar. 14, 2008.
Final, Dec. 14, 2011, U.S. Appl. No. 12/077,005, filed Mar. 14, 2008.
Non-Final, Mar. 29, 2013, U.S. Appl. No. 12/077,005, filed Mar. 14, 2008.
Final, Jul. 16, 2013, U.S. Appl. No. 11/811,228, filed Jun. 8, 2007.
Non-Final, Feb. 20, 2013, U.S. Appl. No. 11/811,228, filed Jun. 8, 2007.
Final, Feb. 1, 2011, U.S. Appl. No. 11/811,228, filed Jun. 8, 2007.
Non-Final, Jul. 7, 2010, U.S. Appl. No. 11/811,228, filed Jun. 8, 2007.
Allowance, Apr. 22, 2009, U.S. Appl. No. 11/811,384, filed Jul. 7, 2007.
Non-Final, Oct. 7, 2008, U.S. Appl. No. 11/811,384, filed Jul. 7, 2007.
Final, Mar. 27, 2012, U.S. Appl. No. 12/132,401, filed Jun. 3, 2008.
Non-Final, Aug. 23, 2011, U.S. Appl. No. 12/132,401, filed Jun. 3, 2008.
Final, Apr. 24, 2012, U.S. Appl. No. 12/218,859, filed Jul. 17, 2008.
Non-Final, Aug. 5, 2011, U.S. Appl. No. 12/218,859, filed Jul. 17, 2008.
Final, Apr. 12, 2011, U.S. Appl. No. 12/218,859, filed Jul. 17, 2008.
Non-Final, Oct. 4, 2010, U.S. Appl. No. 12/218,859, filed Jul. 17, 2008.
Non Final, Aug. 22, 2012, U.S. Appl. No. 12/510,913, filed Jul. 28, 2009.
Final, Apr. 11, 2013, U.S. Appl. No. 12/510,913, filed Jul. 28, 2009.
Allowance, Oct. 9, 2012, U.S. Appl. No. 12/572,021, filed Oct. 1, 2009.
Non-Final, Jun. 19, 2012, U.S. Appl. No. 12/572,021, filed Oct. 1, 2009.
Allowance, Mar. 13, 2012, U.S. Appl. No. 12/576,110, filed Oct. 8, 2009.
Non-Final, Jul. 7, 2011, U.S. Appl. No. 12/576,110, filed Oct. 8, 2009.
Non-Final, Sep. 24, 2013, U.S. Appl. No. 12/720,536, filed Mar. 9, 2010.
Non-Final, Jun. 27, 2012, U.S. Appl. No. 12/720,536, filed Mar. 9, 2010.
Advisory, Jun. 12, 2013, U.S. Appl. No. 12/720,536, filed Mar. 9, 2010.
Final, Apr. 24, 2013, U.S. Appl. No. 12/720,536, filed Mar. 9, 2010.
Non-Final, Sep. 23, 2013, U.S. Appl. No. 12/820,061, filed Jun. 21, 2010.
Final, Jun. 11, 2013, U.S. Appl. No. 12/820,061, filed Jun. 21, 2010.
Non-Final, Feb. 25, 2013, U.S. Appl. No. 12/820,061, filed Jun. 21, 2010.

(56) References Cited

OTHER PUBLICATIONS

Non-Final, Jun. 9, 2011, U.S. Appl. No. 12/722,470, filed Mar. 11, 2010.
Advisory, Jun. 26, 2013, U.S. Appl. No. 13/089,202, filed Apr. 18, 2011.
Non-final, Aug. 1, 2012, U.S. Appl. No. 13/089,202, filed Apr. 18, 2011.
Final, Apr. 8, 2013, U.S. Appl. No. 13/089,202, filed Apr. 18, 2011.
Elhadad, Michael, "Using Argumentation to Control Lexical Choice: A Functional Unification Implementation", 1992, Ph.D. Thesis, Graduate School of Arts and Sciences, Columbia University.
Elhadad, M. and Robin, J., "SURGE: a Comprehensive Plug-in Syntactic Realization Component for Text Generation", 1999 (available at http://www.cs.bgu.ac.il/-elhadad/pub.html).
Fleming, Michael et al., "Mixed-Initiative Translation of Web Pages," AMTA 2000, LNAI 1934, Springer-Verlag, Berlin, Germany, 2000, pp. 25-29.
Och, Franz Josef and Ney, Hermann, "Improved Statistical Alignment Models" ACLOO:Proc. of the 38th Annual Meeting of the Association for Computational Linguistics, 'Online! Oct. 2-6 2000, pp. 440-447, XP002279144 Hong Kong, China Retrieved from the Internet: <URL:http://www-i6.informatik.rwth-aachen.de/Colleagues/och/ACLOO.ps>, retrieved on May 6, 2004, abstract.
Ren, Fuji and Shi, Hongchi, "Parallel Machine Translation: Principles and Practice," Engineering of Complex Computer Systems, 2001 Proceedings, Seventh IEEE Int'l Conference, pp. 249-259, 2001.
Fung et al, "Mining Very-Non-Parallel Corpora: Parallel Sentence and Lexicon Extraction via Bootstrapping and EM", In EMNLP 2004.
Fung, P. and Yee, L., "An IR Approach for Translating New Words from Nonparallel, Comparable Texts", 1998,36th Annual Meeting of the ACL, 17th International Conference on Computational Linguistics, pp. 414-420.
Fung, Pascale, "Compiling Bilingual Lexicon Entries From a Non-Parallel English-Chinese Corpus", 1995, Proc., of the Third Workshop on Very Large Corpora, Boston, MA, pp. 173-183.
Gale, W. and Church, K., "A Program for Aligning Sentences in Bilingual Corpora," 1991, 29th Annual Meeting of the ACL, pp. 177-183.
Gale, W. and Church, K., "A Program for Aligning Sentences in Bilingual Corpora," 1993, Computational Linguistics, vol. 19, No. 1, pp. 75-102.
Galley et al., "Scalable Inference and Training of Context-Rich Syntactic Translation Models," Jul. 2006, in Proc. of the 21st International Conference on Computational Linguistics, pp. 961-968.
Galley et al., "What's in a translation rule?", 2004, in Proc. of HLT/NAACL '04, pp. 1-8.
Gaussier et al, "A Geometric View on Bilingual Lexicon Extraction from Comparable Corpora", In Proceedings of ACL Jul. 2004.
Germann et al., "Fast Decoding and Optimal Decoding for Machine Translation", 2001, Proc. of the 39th AnnualMeeting of the ACL, Toulouse, France, pp. 228-235.
Germann, Ulrich: "Building a Statistical Machine Translation System from Scratch: How Much Bang for theBuck Can We Expect?" Proc. of the Data-Driven MT Workshop of ACL-01, Toulouse, France, 2001.
Gildea, D., "Loosely Tree-based Alignment for Machine Translation," In Proceedings of the 41st Annual Meeting on Assoc. for Computational Linguistics—vol. 1 (Sapporo, Japan, Jul. 7-12, 2003). Annual Meeting of the ACL Assoc. for Computational Linguistics, Morristown, NJ, 80-87. DOI=http://dx.doi.org/10.3115/1075096.1075107.
Grefenstette, Gregory, "The World Wide Web as a Resource for Example-Based Machine Translation Tasks", 1999, Translating and the Computer 21, Proc. of the 21 st International Conf. on Translating and theComputer. London, UK, 12 pp.
Grossi et al, "Suffix Trees and Their Applications in String Algorithms", In. Proceedings of the 1st South American Workshop on String Processing, Sep. 1993, pp. 57-76.
Gupta et al., "Kelips: Building an Efficient and Stable P2P DHT thorough Increased Memory and Background Overhead," 2003 IPTPS, LNCS 2735, pp. 160-169.
Habash, Nizar, "The Use of a Structural N-gram Language Model in Generation-Heavy Hybrid Machine Translation," University of Maryland, Univ. Institute for Advance Computer Studies, Sep. 8, 2004.
Hatzivassiloglou, V. et al., "Unification-Based Glossing", 1995, Proc. of the International Joint Conference on Artificial Intelligence, pp. 1382-1389.
Huang et al., "Relabeling Syntax Trees to Improve Syntax-Based Machine Translation Quality," Jun. 4-9 2006, in Proc. of the Human Language Technology Conference of the North American Chapter of the ACL, pp. 240-247.
Ide, N. and Veronis, J., "Introduction to the Special Issue on Word Sense Disambiguation: The State of the Art", Mar. 1998, Computational Linguistics, vol. 24, Issue 1, pp. 2-40.
Bikel, D., Schwartz, R., and Weischedei, R., "An Algorithm that Learns What's in a Name," Machine Learning 34, 211-231 (1999).
Imamura et al., "Feedback Cleaning of Machine Translation Rules Using Automatic Evaluation," 2003 Computational Linguistics, pp. 447-454.
Imamura, Kenji, "Hierarchical Phrase Alignment Harmonized with Parsing", 2001, in Proc. of NLPRS, Tokyo.
Jelinek, F., "Fast Sequential Decoding Algorithm Using a Stack", Nov. 1969, IBM J. Res. Develop., vol. 13, No. 6, pp. 675-685.
Jones, K. Sparck, "Experiments in Relevance Weighting of Search Terms", 1979, Information Processing & Management, vol. 15, Pergamon Press Ltd., UK, pp. 133-144.
Klein et al., "Accurate Unlexicalized Parsing," Jul. 2003, in Proc. of the 41st Annual Meeting of the ACL, pp. 423-430.
Knight et al., "Integrating Knowledge Bases and Statistics in MT," 1994, Proc. of the Conference of the Association for Machine Translation in the Americas.
Knight et al., "Filling Knowledge Gaps in a Broad-Coverage Machine Translation System", 1995, Proc. of the 14th International Joint Conference on Artificial Intelligence, Montreal, Canada, vol. 2, pp. 1390-1396.
Knight, K. and Al-Onaizan, Y., "A Primer on Finite-State Software for Natural Language Processing", 1999 (available at http://www.isI.edullicensed-sw/carmel).
Knight, K. and Al-Onaizan, Y., "Translation with Finite-State Devices," Proceedings of the 4th AMTA Conference, 1998.
Knight, K. and Chander, I., "Automated Postediting of Documents,"1994, Proc. of the 12th Conference on Artificial Intelligence, pp. 779-784.
Knight, K. and Graehl, J., "Machine Transliteration", 1997, Proc. of the ACL-97, Madrid, Spain, pp. 128-135.
Knight, K. and Hatzivassiloglou, V., "Two-Level, Many-Paths Generation," 1995, Proc. of the 33rd Annual Conference of the ACL, pp. 252-260.
Knight, K. and Luk, S., "Building a Large-Scale Knowledge Base for Machine Translation," 1994, Proc. of the 12th Conference on Artificial Intelligence, pp. 773-778.
Knight, K. and Marcu, D., "Statistics-Based Summarization—Step One: Sentence Compression," 2000, American Association for Artificial Intelligence Conference, pp. 703-710.
Knight, K. and Yamada, K., "A Computational Approach to Deciphering Unknown Scripts," 1999, Proc. of the ACL Workshop on Unsupervised Learning in Natural Language Processing.
Knight, Kevin, "A Statistical MT Tutorial Workbook," 1999, JHU Summer Workshop (available at http://www.isI.edu/natural-language/mUwkbk.rtf).
Knight, Kevin, "Automating Knowledge Acquisition for Machine Translation," 1997, AI Magazine, vol. 18, No. 4.
Knight, Kevin, "Connectionist Ideas and Algorithms," Nov. 1990, Communications of the ACM, vol. 33, No. 11, pp. 59-74.
Knight, Kevin, "Decoding Complexity in Word-Replacement Translation Models", 1999, Computational Linguistics, vol. 25, No. 4.
Knight, Kevin, "Integrating Knowledge Acquisition and Language Acquisition", May 1992, Journal of Applied Intelligence, vol. 1, No. 4.

(56) References Cited

OTHER PUBLICATIONS

Knight, Kevin, "Learning Word Meanings by Instruction," 1996, Proc. of the D National Conference on Artificial Intelligence, vol. 1, pp. 447-454.

Knight, Kevin, "Unification: A Multidisciplinary Survey," 1989, ACM Computing Surveys, vol. 21, No. 1.

Koehn, Philipp, "Noun Phrase Translation," A PhD Dissertation for the University of Southern California, pp. xiii, 23, 25-57, 72-81, Dec. 2003.

Koehn, P. and Knight, K., "ChunkMT: Statistical Machine Translation with Richer Linguistic Knowledge," Apr. 2002, Information Sciences Institution.

Koehn, P. and Knight, K., "Estimating Word Translation Probabilities from Unrelated Monolingual Corpora Using the EM Algorithm," 2000, Proc. of the 17th meeting of the AAAI.

Koehn, P. and Knight, K., "Knowledge Sources for Word-Level Translation Models," 2001, Conference on Empirical Methods in Natural Language Processing.

Agbago, A., et al., "Truecasing for the Portage System," In Recent Advances in Natural Language Processing (Borovets, Bulgaria), Sep. 21-23, 2005, pp. 21-24.

Al-Onaizan et al., "Statistical Machine Translation," 1999, JHU Summer Tech Workshop, Final Report, pp. 1-42.

Al-Onaizan et al., "Translating with Scarce Resources," 2000, 17th National Conference of the American Associationfor Artificial Intelligence, Austin, TX, pp. 672-678.

Al-Onaizan, Y. and Knight K., "Machine Transliteration of Names in Arabic Text,"Proceedings of ACL Workshop on Computational Approaches to Semitic Languages. Philadelphia, 2002.

Al-Onaizan, Y. and Knight, K., "Named Entity Translation: Extended Abstract", 2002, Proceedings of HLT-02, SanDiego, CA.

Al-Onaizan, Y. and Knight, K., "Translating Named Entities Using Monolingual and Bilingual Resources," 2002, Proc. of the 40th Annual Meeting of the ACL, pp. 400-408.

Alshawi et al., "Learning Dependency Translation Models as Collections of Finite-State Head Transducers," 2000, Computational Linguistics, vol. 26, pp. 45-60.

Alshawi, Hiyan, "Head Automata for Speech Translation", Proceedings of the ICSLP 96, 1996, Philadelphia, Pennsylvania.

Ambati, V., "Dependency Structure Trees in Syntax Based Machine Translation," Spring 2008 Report <http://www.cs.cmu.edu/~vamshi/publications/DependencyMT_report.pdf>, pp. 1-8.

Arbabi et al., "Algorithms for Arabic name transliteration," Mar. 1994, IBM Journal of Research and Development, vol. 38, Issue 2, pp. 183-194.

Arun, A., et al., "Edinburgh System Description for the 2006 TC-STAR Spoken Language Translation Evaluation," in TC-STAR Workshop on Speech-to-Speech Translation (Barcelona, Spain), Jun. 2006, pp. 37-41.

Ballesteros, L. et al., "Phrasal Translation and Query Expansion Techniques for Cross-Language Information Retrieval," SIGIR 97, Philadelphia, PA, © 1997, pp. 84-91.

Bangalore, S. and Rambow, O., "Evaluation Metrics for Generation," 2000, Proc. of the 1st International NaturalLanguage Generation Conf., vol. 14, pp. 1-8.

Bangalore, S. and Rambow, O., "Using TAGs, a Tree Model, and a Language Model for Generation," May 2000, Workshop TAG+5, Paris.

Bangalore, S. and Rambow, O., "Corpus-Based Lexical Choice in Natural Language Generation," 2000, Proc. ofthe 38th Annual ACL, Hong Kong, pp. 464-471.

"Bangalore, S. and Rambow, O., ""Exploiting a Probabilistic Hierarchical Model for Generation,"" 2000, Proc. of 18thconf. on Computational Linguistics, vol. 1, pp. 42-48.".

Bannard, C. and Callison-Burch, C., "Paraphrasing with Bilingual Parallel Corpora," In Proceedings of the 43rd Annual Meeting on Association for Computational Linguistics (Ann Arbor, MI, Jun. 25-30, 2005), Annual Meeting of the ACL Assoc. for Computational Linguistics, Morristown, NJ, 597-604. DOI=http://dx.doi.org/10.3115/1219840.

Barnett et al., "Knowledge and Natural Language Processing," Aug. 1990, Communications of the ACM, vol. 33, Issue 8, pp. 50-71.

Baum, Leonard, "An Inequality and Associated Maximization Technique in Statistical Estimation for ProbabilisticFunctions of Markov Processes", 1972, Inequalities 3:1-8.

Berhe, G. et al., "Modeling Service-based Multimedia Content Adaptation in Pervasive Computing," CF '04 (Ischia, Italy) Apr. 14-16, 2004, pp. 60-69.

Boitet, C. et al., "Main Research Issues in Building Web Services for Mutualized, Non-Commercial Translation," Proc. of the 6th Symposium on Natural Language Processing, Human and Computer Processing of Language and Speech, © 2005, pp. 1-11.

Brants, Thorsten, "TnT—A Statistical Part-of-Speech Tagger," 2000, Proc. of the 6th Applied Natural LanguageProcessing Conference, Seattle.

Brill, Eric, "Transformation-Based Error-Driven Learning and Natural Language Processing: A Case Study in Part of Speech Tagging", 1995, Association for Computational Linguistics, vol. 21, No. 4, pp. 1-37.

Brill, Eric. "Transformation-Based Error-Driven Learning and Natural Language Processing: A Case Study in Partof Speech Tagging", 1995, Computational Linguistics, vol. 21, No. 4, pp. 543-565.

Brown et al., "A Statistical Approach to Machine Translation," Jun. 1990, Computational Linguistics, vol. 16,No. 2, pp. 79-85.

Brown et al., "Word-Sense Disambiguation Using Statistical Methods," 1991, Proc. of 29th Annual ACL, pp. 264-270.

Brown et al., "The Mathematics of Statistical Machine Translation: Parameter Estimation," 1993, ComputationalLinguistics, vol. 19, Issue 2, pp. 263-311.

Brown, Ralf, "Automated Dictionary Extraction for "Knowledge-Free" Example-Based Translation," 1997, Proc. of 7th Int'l Cont. on Theoretical and Methodological Issues in MT, Santa Fe, NM, pp. 111-118.

Callan et al., "TREC and TIPSTER 'Experiments with Inquery," 1994, Information Processing and Management, vol. 31, Issue 3, pp. 327-343.

Callison-Burch, C. et al., "Statistical Machine Translation with Word- and Sentence-aligned Parallel Corpora," In Proceedings of the 42nd Meeting on Assoc. for Computational Linguistics (Barcelona, Spain, Jul. 21-26, 2004). Annual Meeting of the ACL. Assoc. for Computational Linguistics, Morristown, NJ, 1.

Carl, Michael. "A Constructivist Approach to Machine Translation," 1998, New Methods of Language Processingand Computational Natural Language Learning, pp. 247-256.

Chen, K. and Chen, H., "Machine Translation: An Integrated Approach," 1995, Proc. of 6th Int'l Cont. on Theoreticaland Methodological Issue in MT, pp. 287-294.

Cheng, P. et al., "Creating Multilingual Translation Lexicons with Regional Variations Using Web Corpora," In Proceedings of the 42nd Annual Meeting on Assoc. for Computational Linguistics (Barcelona, Spain, Jul. 21-26, 2004). Annual Meeting of the ACL. Assoc. for Computational Linguistics, Morristown, NJ, 53.

Cheung et al., "Sentence Alignment in Parallel, Comparable, and Quasi-comparable Corpora", In Proceedings of LREC, 2004, pp. 30-33.

Chinchor, Nancy, "MUC-7 Named Entity Task Definition," 1997, Version 3.5.

Clarkson, P. and Rosenfeld, R., "Statistical Language Modeling Using the CMU-Cambridge Toolkit", 1997, Proc. ESCA Eurospeech, Rhodes, Greece, pp. 2707-2710.

Cohen et al., "Spectral Bloom Filters," SIGMOD 2003, Jun. 9-12, 2003, ACM pp. 241-252.

Cohen, "Hardware-Assisted Algorithm for Full-text Large-Dictionary String Matching Using n-gram Hashing," 1998, Information Processing and Management, vol. 34, No. 4, pp. 443-464.

Yossi, Cohen "Interpreter for FUF," (available at ftp://lftp.cs.bgu.ac.il/pUb/people/elhadad/fuf-life.lf) (downloaded Jun. 1, 2008).

Corston-Oliver, Simon, "Beyond String Matching and Cue Phrases: Improving Efficiency and Coverage in Discourse Analysis", 1998, The AAAI Spring Symposium on Intelligent Text Summarization, pp. 9-15.

Covington, "An Algorithm to Align Words for Historical Comparison", Computational Linguistics, 1996,vol. 22, No. 4, pp. 481-496.

(56) References Cited

OTHER PUBLICATIONS

Dagan, I. and Itai, A., "Word Sense Disambiguation Using a Second Language Monolingual Corpus", 1994, Association for Computational Linguistics, vol. 20, No. 4, pp. 563-596.

Dempster et al., "Maximum Likelihood from Incomplete Data via the EM Algorithm", 1977, Journal of the RoyalStatistical Society, vol. 39, No. 1, pp. 1-38.

Diab, M. and Finch, S., "A Statistical Word-Level Translation Model for Comparable Corpora," 2000, In Proc.of theConference on Content Based Multimedia Information Access (RIAO).

Diab, Mona, "An Unsupervised Method for Multilingual Word Sense Tagging Using Parallel Corpora: A Preliminary Investigation", 2000, SIGLEX Workshop on Word Senses and Multi-Linguality, pp. 1-9.

Eisner, Jason, "Learning Non-Isomorphic Tree Mappings for Machine Translation," 2003, in Proc. of the 41st Meeting of the ACL, pp. 205-208.

Elhadad et al., "Floating Constraints in Lexical Choice", 1996, ACL, vol. 23 No. 2, pp. 195-239.

Elhadad, M. and Robin, J., "An Overview of SURGE: a Reusable Comprehensive Syntactic Realization Component," 1996, Technical Report 96-03, Department of Mathematics and Computer Science, Ben Gurion University, Beer Sheva, Israel.

Elhadad, M. and Robin, J., "Controlling Content Realization with Functional Unification Grammars", 1992, Aspects of Automated Natural Language Generation, Dale et al. (eds)., Springer Verlag, pp. 89-104.

Elhadad, Michael, "FUF: the Universal Unifier User Manual Version 5.2", 1993, Department of Computer Science, Ben Gurion University, Beer Sheva, Israel.

Zhang et al., "Distributed Language Modeling for N-best List Reranking," In Proceedings of the 2006 Conference on Empirical Methods in Natural Language Processing (Sydney, Australia, Jul. 22-23, 2006). ACL Workshops. Assoc. for Computational Linguistics, Morristown, NJ, 216-223.

Patent Cooperation Treaty International Preliminary Report on Patentability and the Written Opinion, International application No. PCT/US2008/004296, Oct. 6, 2009, 5 pgs.

Document, Wikipedia.com, web.archive.org (Feb. 22, 2004) <http://web.archive.org/web/20040222202831 /http://en.wikipedia.org/wikiiDocument>, Feb. 22, 2004.

Identifying, Dictionary.com, wayback.archive.org (Feb. 28, 2007) </http://dictionary.reference.com/browse/identifying>, accessed Oct. 27, 2011 <http://web.archive.org/web/20070228150533/http://dictionary.reference.com/browse/identifying>.

Koehn, P. et al, "Statistical Phrase-Based Translation," Proceedings of HLT-NAACL 2003 Main Papers , pp. 48-54 Edmonton, May-Jun. 2003.

Abney, S.P., "Stochastic Attribute Value Grammars", Association for Computational Linguistics, 1997, pp. 597-618.

Fox, H., "Phrasal Cohesion and Statistical Machine Translation" Proceedings of the Conference on Empirical Methods in Natural Language Processing, Philadelphia, Jul. 2002, pp. 304-311. Association for Computational Linguistics. <URL: http://acl.ldc.upenn.edu/W/W02/W02-1039.pdf>.

Tillman, C., et al, "Word Reordering and a Dynamic Programming Beam Search Algorithm for Statistical Machine Translation," 2003, Association for Computational Linguistics, vol. 29, No. 1, pp. 97-133 <URL: http://acl.ldc.upenn.edu/J/J03/J03-1005.pdf>.

Wang, W., et al. "Capitalizing Machine Translation" In HLT-NAACL '06 Proceedings Jun. 2006. <http://www.isi.edu/natural-language/mt/hlt-naacl-06-wang.pdf>.

Langlais, P. et al., "TransType: a Computer-Aided Translation Typing System" EmbedMT '00 ANLP-NAACL 2000 Workshop: Embedded Machine Translation Systems, 2000, pp. 46-51. <http://acl.ldc.upenn.edu/W/W00/W00-0507.pdf>.

Ueffing et al., "Using POS Information for Statistical Machine Translation into Morphologically Rich Languages," In EACL, 2003: Proceedings of the Tenth Conference on European Chapter of the Association for Computational Linguistics, pp. 347-354.

Frederking et al., "Three Heads are Better Than One," In Proceedings of the 4th Conference on Applied Natural Language Processing, Stuttgart, Germany, 1994, pp. 95-100.

Och et al., "Discriminative Training and Maximum Entropy Models for Statistical Machine Translation," In Proc. of the 40th Annual Meeting of the Association for Computational Linguistics (ACL), Philadelphia, PA, 2002.

Yasuda et al., "Automatic Machine Translation Selection Scheme to Output the Best Result," Proc. of LREC, 2002, pp. 525-528.

Papineni et al., "Bleu: a Method for Automatic Evaluation of Machine Translation", Proc. of the 40th Annual Meeting of the Association for Computational Linguistics (ACL), Jul. 2002, pp. 311-318.

Shaalan et al., "Machine Translation of English Noun Phrases into Arabic", (2004), vol. 17, No. 2, International Journal of Computer Processing of Oriental Languages, 14 pages.

Isahara et al., "Analysis, Generation and Semantic Representation in CONTRAST—A Context-Based Machine Translation System", 1995, Systems and Computers in Japan, vol. 26, No. 14, pp. 37-53.

Proz.com, Rates for proofreading versus Translating, http://www.proz.com/forum/business_issues/202-rates_for_proofreading_versus_translating.html, Apr. 23, 2009, retrieved Jul. 13, 2012.

Celine, Volume discounts on large translation project, naked translations, http://www.nakedtranslations.com/en/2007/volume-discounts-on-large-translation-projects/, Aug. 1, 2007, retrieved Jul. 16, 2012.

Graehl, J and Knight, K, May 2004, Training Tree Transducers, In NAACL-HLT (2004), pp. 105-112.

Niessen et al, "Statistical machine translation with scarce resources using morphosyntactic information", Jun. 2004, Computational Linguistics, vol. 30, issue 2, pp. 181-204.

Liu et al., "Context Discovery Using Attenuated Bloom Filters in Ad-Hoc Networks," Springer, pp. 13-25, 2006.

First Office Action mailed Jun. 7, 2004 in Canadian Patent Application 2408819, filed May 11, 2001.

First Office Action mailed Jun. 14, 2007 in Canadian Patent Application 2475857, filed Mar. 11, 2003.

Office Action mailed Mar. 26, 2012 in German Patent Application 10392450.7, filed Mar. 28, 2003.

First Office Action mailed Nov. 5, 2008 in Canadian Patent Application 2408398, filed Mar. 27, 2003.

Second Office Action mailed Sep. 25, 2009 in Canadian Patent Application 2408398, filed Mar. 27, 2003.

First Office Action mailed Mar. 1, 2005 in European Patent Application No. 03716920.8, filed Mar. 27, 2003.

Second Office Action mailed Nov. 9, 2006 in European Patent Application No. 03716920.8, filed Mar. 27, 2003.

Third Office Action mailed Apr. 30, 2008 in European Patent Application No. 03716920.8, filed Mar. 27, 2003.

Office Action mailed Oct. 25, 2011 in Japanese Patent Application 2007-536911 filed Oct. 12, 2005.

Office Action mailed Jul. 24, 2012 in Japanese Patent Application 2007-536911 filed Oct. 12, 2005.

Final Office Action mailed Apr. 9, 2013 in Japanese Patent Application 2007-536911 filed Oct. 12, 2005.

Office Action mailed May 13, 2005 in Chinese Patent Application 1812317.1, filed May 11, 2001.

Office Action mailed Apr. 21, 2006 in Chinese Patent Application 1812317.1, filed May 11, 2001.

Office Action mailed Jul. 19, 2006 in Japanese Patent Application 2003-577155, filed Mar. 11, 2003.

Office Action mailed Mar. 1, 2007 in Chinese Patent Application 3805749.2, filed Mar. 11, 2003.

Office Action mailed Feb. 27, 2007 in Japanese Patent Application 2002-590018, filed May 13, 2002.

Office Action mailed Jan. 26, 2007 in Chinese Patent Application 3807018.9, filed Mar. 27, 2003.

Office Action mailed Dec. 7, 2005 in Indian Patent Application 2283/DELNP/2004, filed Mar. 11, 2003.

Office Action mailed Mar. 31, 2009 in European Patent Application 3714080.3, filed Mar. 11, 2003.

Agichtein et al., "Snowball: Extracting Information from Large Plain-Text Collections," ACM DL '00, the Fifth ACM Conference on Digital Libraries, Jun. 2, 2000, San Antonio, TX, USA.

(56) References Cited

OTHER PUBLICATIONS

Satake, Masaomi, "Anaphora Resolution for Named Entity Extraction in Japanese Newspaper Articles," Master's Thesis [online], Feb. 15, 2002, School of Information Science, JAIST, Nomi, Ishikaw, Japan.
Office Action mailed Aug. 29, 2006 in Japanese Patent Application 2003-581064, filed Mar. 27, 2003.
Office Action mailed Jan. 26, 2007 in Chinese Patent Application 3807027.8, filed Mar. 28, 2003.
Office Action mailed Jul. 25, 2006 in Japanese Patent Application 2003-581063, filed Mar. 28, 2003.
Huang et al., "A syntax-directed translator with extended domain of locality," Jun. 9, 2006, In Proceedings of the Workshop on Computationally Hard Problems and Joint Inference in Speech and Language Processing, pp. 1-8, New York City, New York, Association for Computational Linguistics.
Melamed et al., "Statistical machine translation by generalized parsing," 2005, Technical Report 05-001, Proteus Project, New York University, http://nlp.cs.nyu.edu/pubs/.
Galley et al., "Scalable Inference and Training of Context-Rich Syntactic Translation Models," Jul. 2006, In Proceedings of the 21st International Conference on Computational Linguistics and 44th Annual Meeting of the ACL, pp. 961-968.
Huang et al., "Statistical syntax-directed translation with extended domain of locality," Jun. 9, 2006, In Proceedings of AMTA, pp. 1-8.
Abney, Steven P., "Parsing by Chunks," 1991, Principle-Based Parsing: Computation and Psycholinguistics, vol. 44, pp. 257-279.

\* cited by examiner

US 8,886,517 B2

TRUST SCORING FOR LANGUAGE TRANSLATION SYSTEMS

CROSS REFERENCE TO RELATED APPLICATIONS

This application is a continuation of, and claims the priority benefit to, co-pending U.S. non-provisional patent application Ser. No. 11/454,212, filed on Jun. 15, 2006, which claims priority to U.S. provisional application Ser. No. 60/691,949, filed on Jun. 17, 2005, U.S. non-provisional patent application Ser. No. 12/820,061, filed on Jun. 21, 2010, now U.S. Pat. No. 8,676,563, issued on Mar. 18, 2014, which is a continuation in part of U.S. non-provisional patent application Ser. No. 12/572,021, filed on Oct. 1, 2009, now U.S. Pat. No. 8,380,486, issued on Feb. 19, 2013, and international application PCT/US2011/039523, filed on Jun. 7, 2011, which are all hereby incorporated by reference herein in their entireties including all references cited therein.

FIELD OF THE PRESENT TECHNOLOGY

The present technology relates generally to generating trust scores for translations, and more specifically, but not by way of limitation to generating trust scores that represent an accuracy of a translation generated by one or more untrusted translation systems. Trust scores may be calculated for translations generated by translation systems having unknown translation processes by comparing the translations of these systems to translations generated by trusted translation systems and evaluating the differences therebetween. Additionally, the technology applies to untrusted translation systems in both the cases when the identity of the translation systems is known and when the identity is unknown.

BACKGROUND

The quality or accuracy of machine translated texts may vary widely depending upon the translation methodologies utilized to generate the translated texts, the difficulty of the texts, and the linguistic differences between the source and target languages. For example, translation systems that utilize differing language models may produce translated texts with different accuracy levels relative to one another. A determination as to the accuracy of these translations often requires human intervention, which is a costly and time intensive undertaking.

SUMMARY OF THE PRESENT TECHNOLOGY

According to some embodiments, the present technology may be directed to methods for generating a trust score for a translation. The methods may comprise: (a) establishing a trust score for at least a portion of a first translation of a source text translated by a trusted translation system, the trust score representing an accuracy level for the first translation; (b) comparing the first translation of the source text generated by the trusted translation system to a second translation of the source text generated by an untrusted translation system; and (c) determining a trust score for the second translation based upon the comparison.

According to some embodiments, the present technology may be directed to additional methods for generating a trust score for a translation. The methods may comprise: (a) determining a translation complexity for the source text provided to an untrusted translation system; (b) evaluating target language constructs included in a translation of the source text generated by an untrusted translation system; and (c) determining a trust score for the translation based upon any of the translation complexity, the target language constructs, or combinations thereof.

According to other embodiments, the present technology may be directed to system for generating a trust score for a translation. These systems may comprise: (a) a memory for storing executable instructions; (b) a processor for executing the executable instructions, the executable instructions comprising: (i) a trust score generator that establishes a trust score for at least a portion of a first translation of a source text translated by a trusted translation system, the trust score representing an accuracy level for the first translation; (b) an analysis module that compares the first translation of the source text generated by the trusted translation system to a second translation of the source text generated by an untrusted translation system; and (c) an inference module that infers a trust score for the second translation based upon the comparison.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION OF EXEMPLARY EMBODIMENTS

Figure 1:
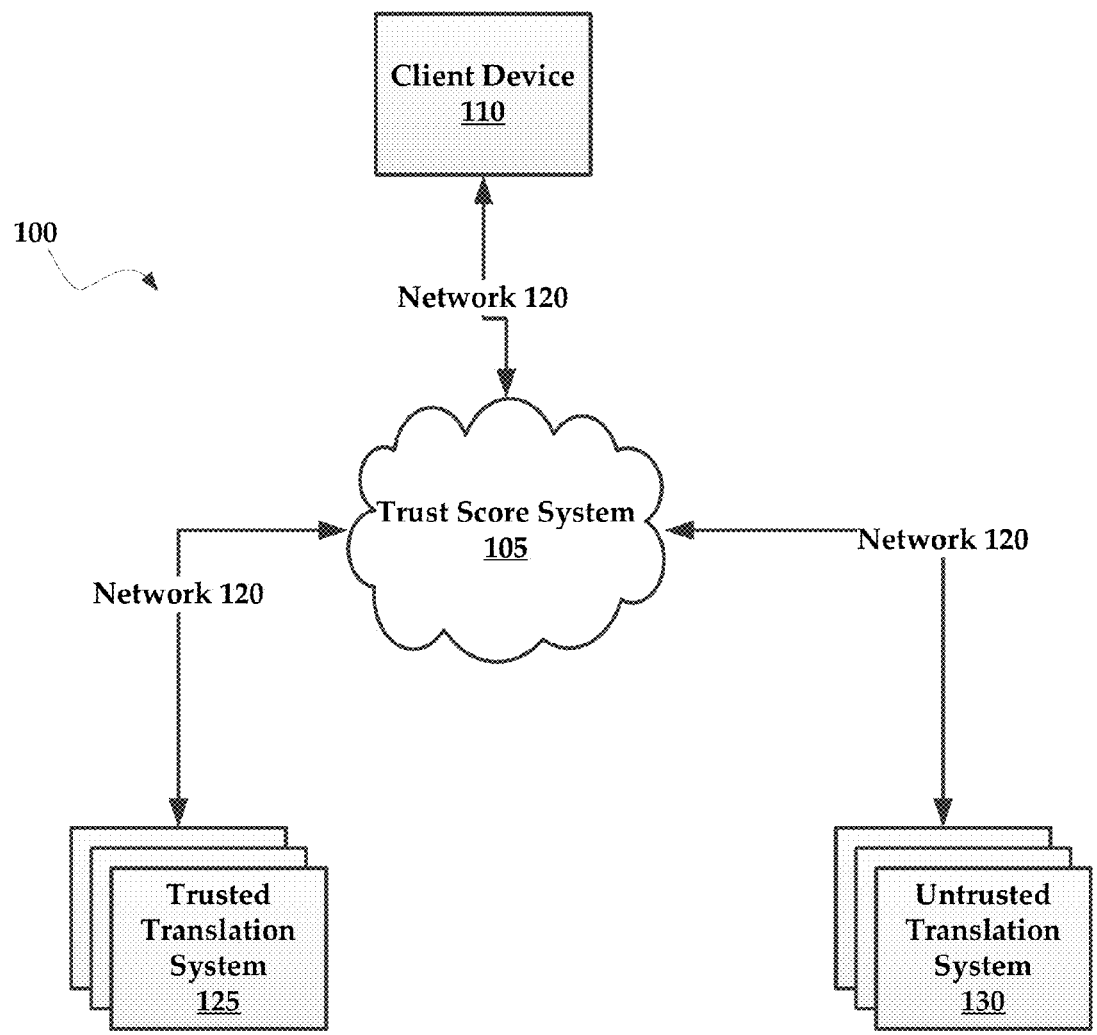
FIG. 1 illustrates an exemplary architecture for practicing aspects of the present technology.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Generally speaking, the present technology is directed to generating trust scores for machine translated texts. More specifically, but not by way of limitation, the present technology may generate or determine a trust score based upon an analysis of the source text and the target translation generated by an untrusted translation system. Used throughout, the term "untrusted" relative to a translation system may refer to the fact that there is little or no a priori knowledge regarding the translation methodologies utilized by the translation system.

Exemplary translation methodologies may comprise, language models, translation memories, language libraries, text/content parsing, segmentation, or other translation functionalities are at least partially unknown. These translation systems are "untrusted" or "unknown" because one cannot directly observe or may not be privy to the exact translation methodologies utilized by the translation system, for example, translation systems that utilize proprietary translation methods. Thus, a typical method for determining the accuracy of these untrusted systems requires human review of the source content and the target translation.

In contrast, a "trusted" or "known" translation system may refer to a translation system where at least a portion of the translation methods of the translation system are known or determinable. Because translation methodologies employed by the trusted translation system are understood, it may be easier to assign an accuracy level (e.g., trust score) to the translation. For example, if the trusted translation system was trained using a highly accurate parallel training corpus (e.g., a library of exemplary source segment and translation segment pairs) it can be assumed that translations generated from this training corpus are likely to be accurate (assuming that the source text and/or the translation correspond to content included in the training corpus).

To determine a trust score for a translation generated by an untrusted translation system, the present technology may evaluate the source text and the target translation to determine the accuracy of the translation. The present technology may evaluate the translation complexity and the translation constructs of the translation to determine a trust score.

In other instances, the present technology may compare a target translation generated by a trusted translation system against a translation of the same source text generated by an untrusted translation system. The present technology may efficiently calculate a trust score for the target translation of the trusted translation system. By determining differences between the translations of the same source text by both the trusted and untrusted translation systems, the present technology may infer or approximate a trust score for the translation generated by the untrusted translation system. For example, if there are relatively few differences between the target translations, and the trust score for the trusted translation is high, the present technology may infer that the trust score for the untrusted translation system is also high.

In sum, the present technology may allow translators to determine an accuracy level for a translation generated by any translation system, even a translation system for which the translator possesses very little, or even no, a prior knowledge regarding the translation methodologies of the system.

The present technology may also determine confidence levels that determine a likelihood that a trust scores are accurate. Moreover, the present technology may modify a trust score if the confidence level indicates that the trust score is inaccurate. It is noteworthy that the confidence level of the trust score may also be influenced by whether the identity of the untrusted translation system is known or unknown.

Additional details regarding the calculation of trust scores is described in U.S. non-provisional patent application Ser. No. 11/454,212, filed on Jun. 15, 2006, U.S. non-provisional patent application Ser. No. 12/820,061, filed on Jun. 21, 2010, and international application PCT/US2011/039523, all of which were incorporated by reference above. Moreover, further information regarding the calculation of trust scores and automatic ranking of translations using the same are included in a non-patent publication entitled: *TrustRank: Inducing Trust in Automatic Translations via Ranking*, co-authored by Radu Soricut and Abdessamad Echihabi, published *In Proceedings of the 48th Annual Meeting of the Association for Computational Linguistics* (July 2010), pp. 612-621.

These and other advantages of the present technology will be described in greater detail below with reference to the collective drawings (i.e., FIGS. 1-5).

FIG. 1 illustrates an exemplary architecture 100 for practicing aspects of the present technology. According to some embodiments, the exemplary architecture 100, hereinafter "architecture 100," may generally include a trust score system, hereinafter "system 105." Translators or other end users may interact with the system 105 using a client device 110. In other embodiments, translators may interact with the system 105 via a web based interface, or an application resident on the client device 110.

The client device 110 and the system 105 may be communicatively coupled via a network 120. It is noteworthy to mention that the network 120 may include any one (or combination) of private or public communications networks such as the Internet.

The system 105 may also communicatively couple with one or more trusted translation systems, such as trusted translation system 125 and one or more untrusted translation systems, such as untrusted translation system 130. In some instances, each of the trusted and untrusted translation systems 125 and 130 may communicatively couple with the system 105 over the network 120 using an application programming interface ("API"). It is noteworthy that other methods/systems that allow the translation systems and the system 105 to communicatively couple with one another, that would be known to one or ordinary skill in the art, are likewise contemplated for use in accordance with the present disclosure.

According to some embodiments, the system 105 may include a cloud-based computing environment. In general, a cloud-based computing environment is a resource that typically combines the computational power of a large grouping of processors and/or that combines the storage capacity of a large grouping of computer memories or storage devices. For example, systems that provide a cloud resource may be utilized exclusively by their owners, such as Google™ or Yahoo!™; or such systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depend on the type of business associated with the user.

The system 105 may be generally described as a particular purpose computing environment that includes executable instructions that are configured to generate trust scores for translations of source content from untrusted translation systems 130. The term "generate" as used herein may be understood to comprise other actions such as create, assign, calculate, infer, determine, locate, establish, and other similar actions that would be known to one of ordinary skill in the art.

Figure 2:
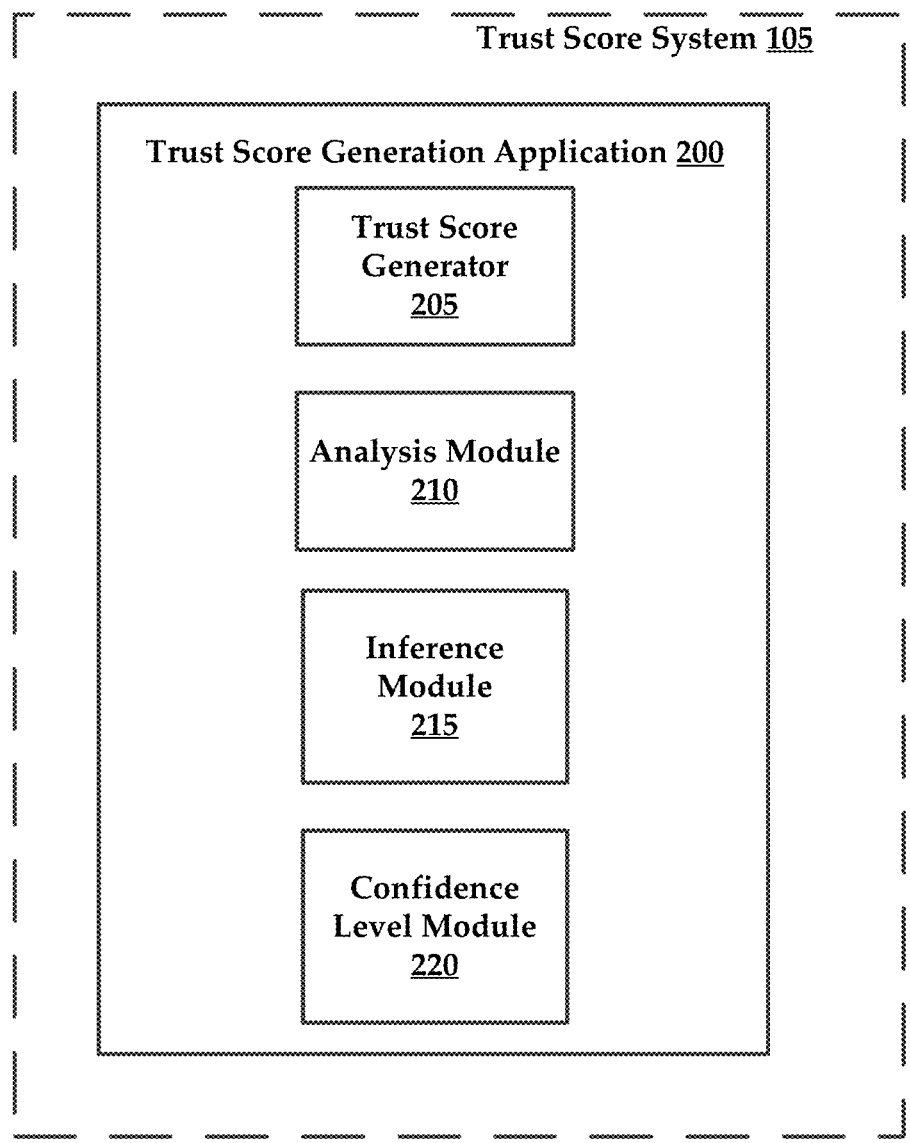
FIG. 2 illustrates an exemplary trust score system, constructed in accordance with the present technology.

In some embodiments, the system 105 may include executable instructions in the form of a trust score generation application, hereinafter referred to as "application 200" that provides various functionalities that will be described in greater detail herein. FIG. 2 illustrates and exemplary schematic diagram of the application 200.

According to some embodiments, the application 200 may be executed to calculate a trust score for a translation that was generated by an untrusted translation system 130. The following method may be referred to as the input/output analysis method. The application 200 may first establish a trust score for at least a portion of a first translation of a source text translated by a trusted translation system 125. Again, the trust score may represent an accuracy level for the first translation. Next, the application 200 may compare the first translation of the source text generated by the trusted translation system 125 to a second translation of the source text generated by an untrusted translation system 130. Additionally, the application 200 may then determine a trust score for the second translation based upon the comparison.

According to other embodiments, the application 200 may be executed to generate a trust score for a translation that was generated by an untrusted translation system 130. The following method may be referred to as the parallel output analysis method. Initially, the application 200 may evaluate a source text which was provided to an untrusted translation system 130. The application 200 may evaluate the source text using a language model to establish a translation complexity for the source text. Next, the application 200 may evaluate target language constructs included in a translation of the source text by the untrusted translation system 130. Finally, the application 200 may then determine a trust score for the translation based upon any of the translation complexity, the target language constructs, or combinations thereof.

While the above described methods for generating trust scores have been addressed, one of ordinary skill in the art will appreciate that similar methods for calculating trust scores for translations generated by untrusted translation systems 130 that fall within the scope of these methods are likewise contemplated for use in accordance with the present technology. A description of the application 200 for generating trust scores in accordance with the above-described methods is provided below.

FIG. 2 shows the application 200 as generally comprising components such a trust score generator 205, an analysis module 210, an inference module 215, and a confidence level module 220. It is noteworthy that the application 200 may include additional modules, engines, or components, and still fall within the scope of the present technology. As used herein, the terms "module" and "engine" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality. In other embodiments, individual components of the application 200 may include separately configured web servers.

According to some embodiments, a translator may desire to calculate a trust score for a translation generated by an untrusted translation system 130 (or more than one untrusted translation system 130). Thus, the translator may provide a trusted translation system 125 with a source text, which is to be translated into at least one target language. Once a target translation has been performed for the source text, the trust score generator 205 may be executed determine a trust score for the target translation (also referred to as a first translation) generated by the trusted translation system 125.

Because the translation methods of the trusted translation system 125 are known, the trust score generator 205 may efficiently evaluate the accuracy of the target translation by way of a variety of methods. For example, the trust score generator 205 may compare the source text and target translation to translation pairs included in a training corpus. It will be understood that the analysis of the source text and the target translation may be conducted on a granular or segment level. For example, source text segments such as words may be analyzed as well as their counterpart target translation words. If the source text and/or target translations correspond to pairs included in the parallel training corpus, it may be inferred that the translation is accurate.

In other embodiments, the translated content may be verified by a human translator and provided to the trust score generator 205. Moreover, target translations in general may be assigned a trust score by a human translator, which is provided to the trust score generator 205.

According to some embodiments, a trust score for a translation may comprise an average of a sum of trust scores for translated target language segments of the source text. Moreover, a trust score for a translated target language segment may be weighted based upon the relative importance of the translated target language segment in the translation. For example, a translated target language segment that corresponds to an object of a sentence may be weighted higher than an adjective for the same sentence. Thus, inaccuracies in the translated target language segment that corresponds to the object have a greater negative affect on the trust score for the target translation than an inaccurate translation of the adjective.

In other instances, a trust score may be determined by the trust score generator 205, which evaluates the length of target translation constructs included in a translation. A target language construct may comprise one or more translated segments that are joined together to form a phrase or sentence. Again, translated segments may correspond to source segments. The length of the translation construct may indicate that a plurality of source segments have been translated correctly and associated with one another to create a recognizable phrase or sentence. Thus, as the length of the translation construct increases, the likelihood that the accuracy of the translation of the source segments is high increases. In other words, it would be difficult to generate a reactively long translation construct with words that are poorly translated. Conversely, if a translation appears to require a word-for-word translation, then it may be inferred that the translation is relatively inaccurate and a lower trust score may be assigned to the translation.

Additionally, in some instances, the trust score generator 205 may infer the accuracy of a translation by evaluating a domain associated with the source text and a domain associated with the target translation. For example, if the domain of the source text relates to sporting events and the domain of the target translation relates to food, it can be inferred that the target translation is inaccurate. Again, this comparison may be conducted on a granular, word level, a phrase level, a sentence or paragraph level, or even at a document level. Additionally, domain level evaluations may also be utilized to generate a confidence level for a trust score, as will be described in greater detail below.

According to some embodiments, the trust score generator 205 may utilize the analysis module 210 to evaluate and consider a translation complexity for the source text when assigning a trust score to a translation. In some instances, the analysis module 210 may utilize a language model (or multiple language models) or a translation memory to evaluate the translation complexity of the source text. If the source text is determined to comprise translation segments that are rarely (or never) encountered, it may be inferred that the translation of these complex source segments may be at least partially inaccurate.

Once a trust score has been established for a first translation by the trust score generator 205, the analysis module 210 may be executed to compare the first translation to a second translation generated by an untrusted translation system 130. Thus, the analysis module 210 may receive a second translation of the same source text from an untrusted translation system 130. Generally speaking, the analysis module 210 may determine differences that exist between the first translation and the second translation. Depending on the differences therebetween, the analysis module 210 may determine a basis for assigning or determining a trust score for the second translation. For example, if the first and second translations are 90% similar to one another, it can be inferred that the translations are similar enough that the inference module 215 may assign a trust score to the second translation that is substantially similar to the trust score of the first translation. Thus, translators may establish a threshold value that is used by the inference module 215 as a reference point for assignment of a trust score value to the second translation. By way of non-limiting example, a threshold value of 95% may be established. Thus, comparisons of first and second translations that are at least 95% similar may result in the assignment of trust score of the first translation to the second translation. Comparisons that yield comparative values of less than 95% may be subject to additional scrutiny by machine or human evaluation.

Advantageously, the differing content may also be evaluated to adjust the trust scores of either the first or second translations. For example, if a human translator determines that the remaining 10% of content that is different between the first and second translations is significant, the trust score generator 205 may modify the trust score of the errant translation. Continuing with the example, if a human translator determines that the remaining 10% differential is attributed to inaccuracies in the second translation, the trust score for the second translation may be adjusted downwardly. Likewise, if the remaining 10% differential is attributed to inaccuracies in the first translation, the trust score associated with the first translation may be adjusted downwardly, while the trust score of the second translation is increased (if the second translation is, in fact, accurate).

According to some embodiments, the application 200 may generate trust scores for translations generated by a plurality of untrusted translation systems 130. The application 200 may then rank these translations according to their trust scores. Additionally, the translations may be provided to a translator in a ranked list format.

Once the analysis module 210 has conducted a comparison, the inference module 215 may then determine a trust score for the second translation based upon the comparison. Again, if the translations are very similar to one another, the inference module 215 may assign the trust score of the first translation to the second translation.

As mentioned above, the trust score assigned to the second translation may be modified. In particular, the confidence level module 220 may be executed to determine a likelihood that the trust score associated with either the first or second translation score is accurate. In some instances, the confidence level module 220 may utilize a training corpus as a basis for evaluating not only the source text but also the first and second translations. Because the training corpus includes accurate source and translation pairs, the source text and first and second translations may be compared to the training corpus. If the source text and/or target translations can be matched (even at least partially) to content included in the training corpus, it can be inferred that the source text and/or the target translations are likely to be accurate. Thus, if the second translation has been assigned a trust score of 8.5 (where zero indicates a very poor translation and a ten indicates a perfect translation), and the second translation substantially matches a translation included in a training corpus, the trust score of the second translation may be selectively increased to 9. As mentioned earlier, a comparison of domains between source and translation content may also be utilized to modify a confidence level for either the first or second translations.

The previous examples are non-limiting and therefore one of ordinary skill in the art will appreciate that a variety of indicators, or combinations of indicators, may be utilized to determine a confidence level for a trust score. Again, in some embodiments, the confidence level may be utilized to adjust the trust score. Again, it is noteworthy that the confidence level of the trust score calculated by the confidence level module 220 may be influenced by whether the identity of the untrusted translation system 130 is known or unknown. For example, if it is known that the translation methodologies utilized by a particular translation system are highly accurate and dependable, the confidence level module 220 may adjust the confidence level of the trust score to reflect this knowledge.

Figure 3:
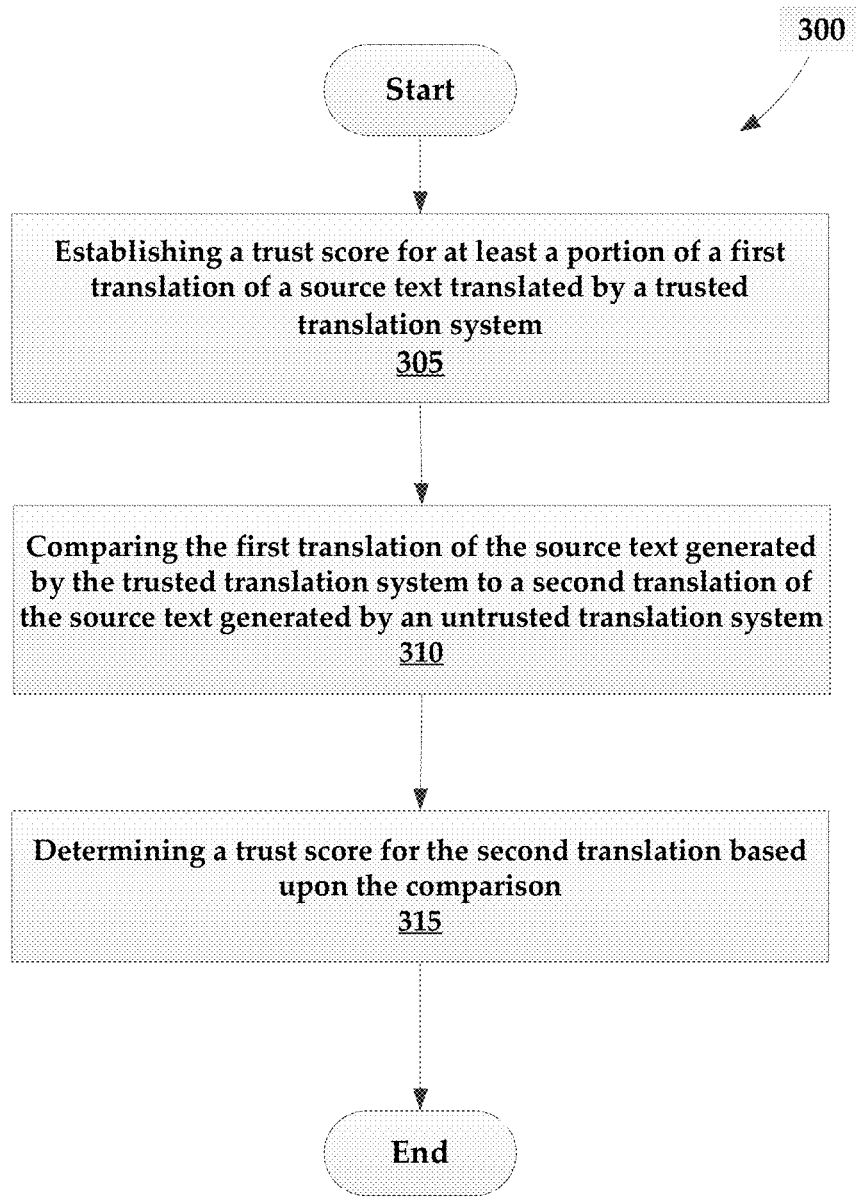
FIG. 3 is a flowchart of an exemplary method for generating a trust score for a translation.

FIG. 3 is a flowchart of an exemplary method for generating a trust score for a translation. The method 300 may comprise a step 305 of establishing a trust score for at least a portion of a first translation of a source text translated by a trusted translation system. It is noteworthy that the trust score may represent an accuracy level for the first translation. Next, the method 300 may comprise a step 310 of comparing the first translation of the source text generated by the trusted translation system to a second translation of the source text generated by an untrusted translation system 130. Once the comparison has been conducted, the method 300 may comprise a step 315 of determining a trust score for the second translation based upon the comparison. Again, determining a trust score may comprise assigning the trust score of the first translation to the second translation, or other methods as described in greater detail above.

Figure 4:
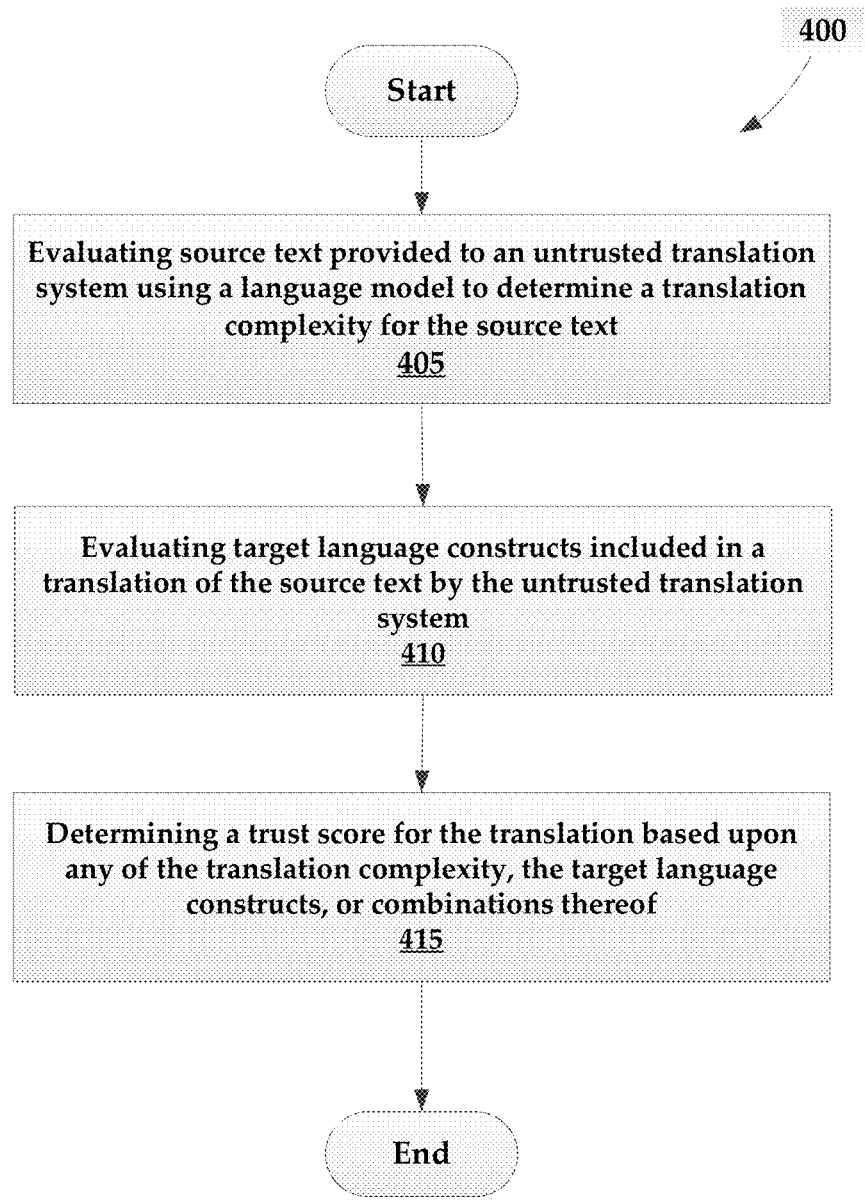
FIG. 4 is a flowchart of another exemplary method for generating a trust score for a translation.

FIG. 4 is a flowchart of another exemplary method for generating a trust score for a translation. According to some embodiments, the method 400 may comprise a step 405 of evaluating source text provided to an untrusted translation system 130 using a language model to determine a translation complexity for the source text. In some instances, the translation complexity may be established by the source text using a language model.

Next, the method 400 may comprise a step 410 of evaluating target language constructs included in a translation of the source text by the untrusted translation system 130, as well as a step 415 of determining a trust score for the translation based upon any of the translation complexity, the target language constructs, or combinations thereof.

Figure 5:
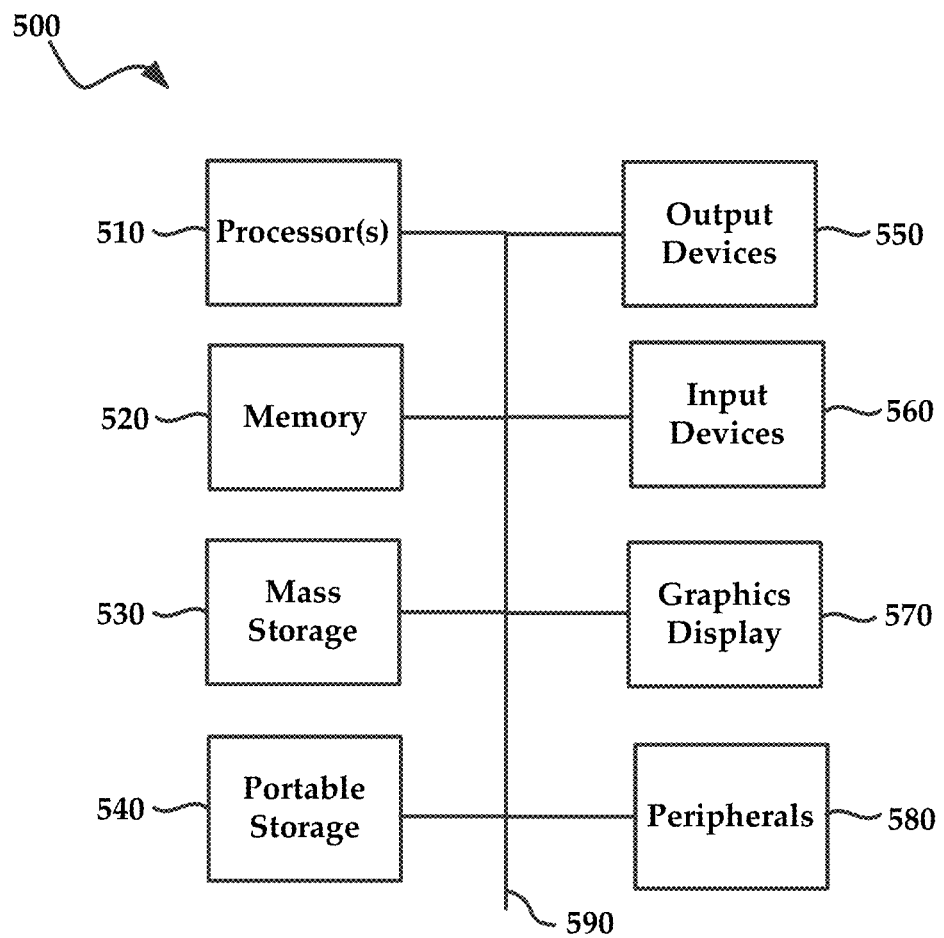
FIG. 5 is a block diagram of an exemplary computing system for implementing embodiments of the present technology.

FIG. 5 illustrates an exemplary computing system 500 that may be used to implement an embodiment of the present technology. The system 500 of FIG. 5 may be implemented in the contexts of the likes of computing systems, networks, exchanges, servers, or combinations thereof disclosed herein. The computing system 500 of FIG. 5 includes one or more processors 510 and main memory 520. Main memory 520 stores, in part, instructions and data for execution by processor 510. Main memory 520 may store the executable code when in operation. The system 500 of FIG. 5 further includes a mass storage device 530, portable storage device 540, output devices 550, user input devices 560, a graphics display 570, and peripheral devices 580.

The components shown in FIG. 5 are depicted as being connected via a single bus 590. The components may be connected through one or more data transport means. Processor 510 and main memory 520 may be connected via a local microprocessor bus, and the mass storage device 530, peripheral device(s) 580, portable storage device 540, and graphics display 570 may be connected via one or more input/output (I/O) buses.

Mass storage device 530, which may be implemented with a magnetic disk drive or an optical disk drive, is a non-volatile storage device for storing data and instructions for use by processor 510. Mass storage device 530 may store the system software for implementing embodiments of the present technology for purposes of loading that software into main memory 520.

Portable storage device 540 operates in conjunction with a portable non-volatile storage medium, such as a floppy disk, compact disk, digital video disc, or USB storage device, to input and output data and code to and from the computer system 500 of FIG. 5. The system software for implementing embodiments of the present technology may be stored on such a portable medium and input to the computer system 500 via the portable storage device 540.

Input devices 560 provide a portion of a user interface. Input devices 560 may include an alphanumeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Suitable output devices include speakers, printers, network interfaces, and monitors.

Graphics display 570 may include a liquid crystal display (LCD) or other suitable display device. Graphics display 570 receives textual and graphical information, and processes the information for output to the display device.

Peripherals devices 580 may include any type of computer support device to add additional functionality to the computer system. Peripheral device(s) 580 may include a modem or a router.

The components provided in the computer system 500 of FIG. 5 are those typically found in computer systems that may be suitable for use with embodiments of the present technology and are intended to represent a broad category of such computer components that are well known in the art. Thus, the computer system 500 of FIG. 5 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Macintosh OS, Palm OS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, and any other memory chip or cartridge.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for generating a trust score for a translation, the method comprising:
    establishing, using a processor, a trust score for at least a portion of a first translation of a source text translated by a trusted translation system, the trust score representing an accuracy level for the first translation;
    comparing, using the processor, the first translation of the source text generated by the trusted translation system to a second translation of the source text generated by an untrusted translation system;
    evaluating, using the processor, the source text using a language model to determine a translation complexity for the source text; and
    determining, using the processor, a trust score for the second translation based upon the comparison and using the determined translation complexity.

2. The method according to claim 1, further comprising generating a confidence level for the trust score, the confidence level representing a likelihood that the trust score is accurate.

3. The method according to claim 2, further comprising modifying the trust score based upon the confidence level.

4. The method according to claim 2, wherein generating the confidence level for the trust score comprises:
    comparing any of the source text, the second translation or combinations thereof to parallel corpora utilized to train the trusted translation system; and
    determining the confidence level for the trust score based upon the comparison.

5. The method according to claim 1, wherein the untrusted translation system is a translation system that utilizes an at least partially unknown translation method.

6. The method according to claim 1, wherein the trust score for the first translation comprises an average of a sum of trust scores for translated target language segments of the source text.

7. A method for generating a trust score for a translation, the method comprising:
    determining, using a processor, a translation complexity for a source text;
    calculating, using the processor, a first trust score for a first translation of the source text performed by a trusted translation system, the trust score;
    evaluating, using the processor, target language constructs included in a second translation of the source text generated by an untrusted translation system; and
    comparing, using the processor, the first translation to the second translation;

calculating, using the processor, a second trust score for the second translation based upon any combination of the translation complexity, the target language constructs, the first trust score, and the comparison of the first translation to the second translation.

8. The method according to claim 7, evaluating a length of each of the target language constructs and determining a second trust score for each target language construct based upon the length.

9. The method according to claim 8, wherein generating the second trust score for the translation comprises calculating an average of a sum of trust scores for the target language constructs.

10. The method according to claim 7, further comprising verifying the second trust score for an untrusted translation by comparing a domain of the source text with a domain of the translation, wherein a divergence in domains indicates an inaccurate translation.

11. The method according to claim 7, wherein determining a translation complexity for the source text comprises evaluating source text provided to an untrusted translation system using a language model.

12. A system for generating a trust score for a translation, the system comprising:
    a memory for storing executable instructions; and
    a processor for executing the executable instructions, the executable instructions comprising:
        a trust score generator that establishes a trust score for at least a portion of a first translation of a source text translated by a trusted translation system, the trust score representing an accuracy level for the first translation;
        an analysis module that:
            compares the first translation of the source text generated by the trusted translation system to a second translation of the source text generated by an untrusted translation system; and
            evaluates the source text using a language model to determine a translation complexity for the source text; and
        an inference module that infers a trust score for the second translation based upon the comparison and the translation complexity determined for the source text.

13. The system according to claim 12, further comprising a confidence level module that generates a confidence level for the trust score, the confidence level representing a likelihood that the trust score is accurate.

14. The system according to claim 13, wherein the confidence level module modifies the trust score based upon the confidence level.

15. The system according to claim 13, wherein the confidence level module generates the confidence level for the trust score by:
    comparing any of the source text, the second translation or combinations thereof to parallel corpora utilized to train the trusted translation system; and
    determining the confidence level for the trust score based upon the comparison.

16. The system according to claim 12, wherein the untrusted translation system is a translation system that utilizes an at least partially unknown translation method.

17. The system according to claim 12, wherein a trust score for the first translation comprises an average of a sum of trust scores for translated target language segments of the source text.

18. The system according to claim 12, wherein the trust score generator generates a ranked list of target translations based upon trust scores associated with the target translations, the target translations being generated by a plurality of untrusted target translation systems.

* * * * *